US012610077B2

(12) United States Patent
Zhang et al.

(10) Patent No.: US 12,610,077 B2
(45) Date of Patent: Apr. 21, 2026

(54) ADAPTIVE BILATERAL MATCHING FOR DECODER SIDE AFFINE MOTION VECTOR REFINEMENT

(71) Applicant: QUALCOMM Incorporated, San Diego, CA (US)

(72) Inventors: Yan Zhang, San Diego, CA (US); Han Huang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 18/507,544

(22) Filed: Nov. 13, 2023

(65) Prior Publication Data

US 2024/0179342 A1     May 30, 2024

Related U.S. Application Data

(60) Provisional application No. 63/384,979, filed on Nov. 25, 2022.

(51) Int. Cl.

| | |
|---|---|
| *H04N 19/52* | (2014.01) |
| *H04N 19/105* | (2014.01) |
| *H04N 19/139* | (2014.01) |
| *H04N 19/176* | (2014.01) |
| *H04N 19/70* | (2014.01) |

(52) U.S. Cl.
CPC ........... *H04N 19/52* (2014.11); *H04N 19/105* (2014.11); *H04N 19/139* (2014.11); *H04N 19/176* (2014.11); *H04N 19/70* (2014.11)

(58) Field of Classification Search
CPC .. H04N 19/105; H04N 19/139; H04N 19/176; H04N 19/52; H04N 19/54; H04N 19/70
See application file for complete search history.

(56) References Cited

U.S. PATENT DOCUMENTS

| | | | |
|---|---|---|---|
| 2020/0213612 A1* | 7/2020 | Liu | H04N 19/53 |
| 2020/0382771 A1* | 12/2020 | Liu | H04N 19/139 |
| 2021/0227246 A1* | 7/2021 | Liu | H04N 19/593 |

(Continued)

FOREIGN PATENT DOCUMENTS

| | | |
|---|---|---|
| WO | 2023060913 A1 | 4/2023 |

OTHER PUBLICATIONS

Blestel M., et al., "EE2-2.1: On Affine DMVR", Joint Video Experts Team (JVET) of ITU-T SG 16 WP 3 and ISO/IEC JTC 1/SC 29, JVET-AD0182-v2, 30th Meeting, Antalya, TR, Apr. 21-28, 2023, pp. 1-10.

(Continued)

*Primary Examiner* — Anner Holder
(74) *Attorney, Agent, or Firm* — Shumaker & Sieffert, P. A.

(57) ABSTRACT

A video coder is configured to receive a first block of video data to be coded using adaptive affine decoder side motion vector refinement (DMVR). The video coder may determine to set a first motion vector difference (MVD) for a first reference picture list to zero, and then refine control point motion vectors (CPMVs) associated with a second reference picture list to generate refined CPMVs. The video coder may then code the first block of video data using the refined CPMVs.

48 Claims, 11 Drawing Sheets

(56) References Cited

U.S. PATENT DOCUMENTS

| | | | | | |
|---|---|---|---|---|---|
| 2021/0392357 | A1* | 12/2021 | Xu | .......................... | H04N 19/70 |
| 2022/0053206 | A1* | 2/2022 | Ko | ........................ | H04N 19/523 |
| 2022/0295088 | A1* | 9/2022 | Zhang | .................... | H04N 19/52 |
| 2023/0328225 | A1* | 10/2023 | Li | ......................... | H04N 19/172 |
| | | | | | 375/240.15 |
| 2024/0267533 | A1* | 8/2024 | Zhang | .................. | H04N 19/176 |
| 2025/0142056 | A1* | 5/2025 | Zhang | .................. | H04N 19/172 |
| 2025/0142093 | A1* | 5/2025 | Zhao | ..................... | H04N 19/176 |
| 2025/0184522 | A1* | 6/2025 | Zhao | ....................... | H04N 19/70 |

OTHER PUBLICATIONS

Blestel M., et al., "EE2-related: Complexity Reduction for Decoder Side Control Point Motion Vector Refinement (test 2.3b)", JVET-AC0276-v1, Joint Video Experts Team (JVET) of ITU-T SG 16 WP 3 and ISO/IEC JTC 1/SC 29, 29th Meeting, by teleconference, Jan. 11-20, 2023, pp. 1-5.
Chen J., et al., "EE2-2.6: DMVR for Affine Merge Coded Blocks", Joint Video Experts Team (JVET) of ITU-T SG 16 WP 3 and ISO/IEC JTC 1/SC 29, JVET-AB0112-v1, 28th Meeting, Mainz, DE, Oct. 20-28, 2022, pp. 1-3.
Chen J., et al., "EE2-2.6-related: On Decoder-side Affine Model Refinement (DAMR)", Joint Video Experts Team (JVET) of ITU-T SG 16 WP 3 and ISO/IEC JTC 1/SC 29, JVET-AB0145-v2, 28th Meeting, Mainz, DE, Oct. 20-28, 2022, pp. 1-4.
Coban M., et al., "Algorithm Description of Enhanced Compression Model 8 (ECM 8)", JVET-AC2025, Joint Video Experts Team (JVET) of ITU-T SG 16 WP 3 and ISO/IEC JTC 1/SC 29, 29th Meeting, by teleconference, Jan. 11-20, 2023, pp. 1-74.
Huang H., et al., "EE2 Test 2.1, 2.2, 2.3, 2.4: Affine DMVR", Joint Video Experts Team (JVET) of ITU-T SG 16 WP 3 and ISO/IEC JTC 1/SC 29, JVET-AC0144-v3, 29th Meeting, by Teleconference, Jan. 11-20, 2023, pp. 1-5.
Huang H., et al., "EE2-Related: Control-Point Motion Vector Refinement for Affine DMVR", JVET-AB0178, Oct. 15, 2022, 4 Pages.
Huang H., et al., "EE2-Related: Sub-Block Processing for Affine DMVR", JVET-AB0177, Oct. 15, 2022, 6 Pages.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.
Seregin V., et al., "Exploration Experiment on Enhanced Compression Beyond VVC Capability (EE2)", Joint Video Experts Team (JVET) of ITU-T SG 16 WP 3 and ISO/IEC JTC 1/SC 29, JVET-AB2024-v3, 28th Meeting: Mainz, DE, Oct. 20-28, 2022, pp. 1-20.
Seregin V., et al., "Exploration Experiment on Enhanced Compression Beyond VVC Capability (EE2)", Joint Video Experts Team (JVET) of ITU-T SG 16 WP 3 and ISO/IEC JTC 1/SC 29, JVET-AC2024-v2, 29th Meeting, by teleconference, Jan. 11-20, 2023, pp. 1-30.
Zhang Y., et al., "EE2-2.1: Regression Based Affine Candidate Derivation", JVET-AA0107-v2, Joint Video Experts Team (JVET) of ITU-T SG 16 WP 3 and ISO/IEC JTC 1/SC 29, 27th Meeting, by teleconference, Jul. 13-22, 2022, pp. 1-5.
Chen J (Alibaba Group)., et al., "Non-EE2: DMVR for Affine Merge Coded Blocks", JVET-AA0144-v2, Joint Video Experts Team (JVET) of ITU-T SG 16 WP 3 and ISO/IEC JTC 1/SC 29, 27th Meeting, by teleconference, Jul. 13-22, 2022, Teleconference, The Joint Video Exploration Team of ISO/IEC JTC1/SC29/WG11 And ITU-T SG.16 ), m60120, Jul. 18, 2022, 5 Pages, XP030303030, Abstract, Sections 1 and 2.
Han H., et al., "Adaptive Bilateral Matching for Decoder-Side Motion Vector Refinement Video Coding", 2022 Data a Compression Conference (DCC), IEEE, Mar. 22, 2022, pp. 342-348, XP034143769, Section [3. Proposed Adaptive Bilateral Matching for DMVR], Abstract, Sections 1, 3 and 4, figures 2, 3.
Huang H (Qualcomm)., et al., "EE2-Related: Adaptive Decoder Side Motion Vector Refinement", Joint Video Experts Team (JVET) of ITU-T SG 16 WP 3 and ISO/IEC JTC 1/SC 29, 23rd Meeting, by teleconference, Jul. 7-16, 2021, No. JVET-W0107-v2, m57224, Jul. 6, 2021, XP030296054, 3 Pages, Abstract, Section 2.
Huang H (Qualcomm)., et al., "EE2-related: Sub-block Processing for Affine DMVR", JVET-AB0177-v2, m60965, The Joint Video Exploration Team OF ISO/IEC JTC1/SC29/WG11 and ITU-T SG.16, Joint Video Experts Team (JVET) of ITU-T SG 16 WP 3 and ISO/IEC JTC 1/SC 29, 28th Meeting, Mainz, DE, Oct. 20-28, 2022, Oct. 17, 2022, 3 Pages, XP030304760, XP030304762, abstract Sections 1 and 2.
International Search Report and Written Opinion—PCT/US2023/079792—ISA/EPO—Mar. 27, 2024.

* cited by examiner

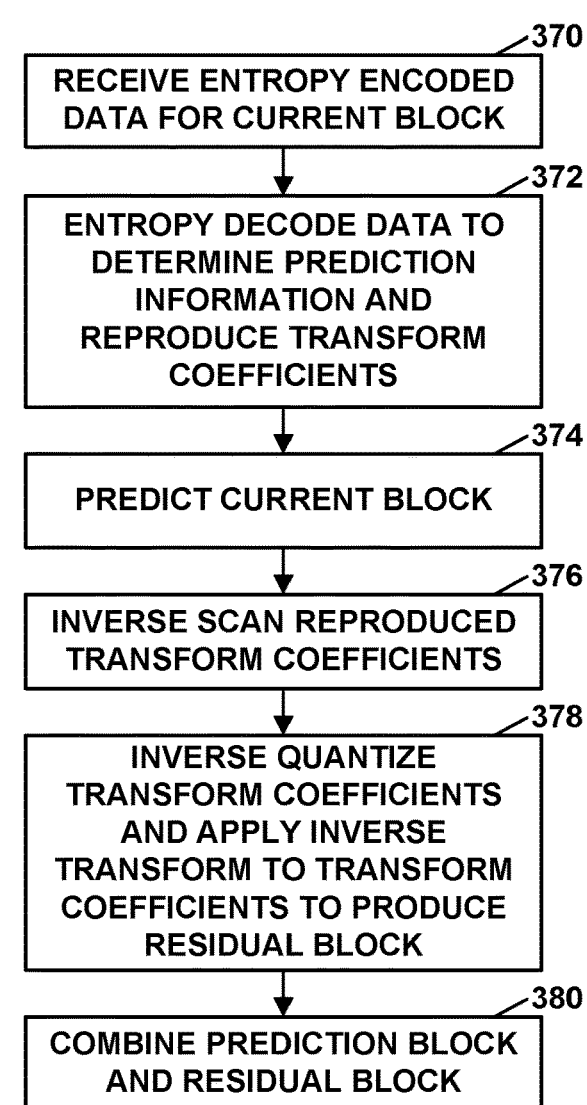

370

RECEIVE ENTROPY ENCODED
DATA FOR CURRENT BLOCK

372

ENTROPY DECODE DATA TO
DETERMINE PREDICTION
INFORMATION AND
REPRODUCE TRANSFORM
COEFFICIENTS

374

PREDICT CURRENT BLOCK

376

INVERSE SCAN REPRODUCED
TRANSFORM COEFFICIENTS

378

INVERSE QUANTIZE
TRANSFORM COEFFICIENTS
AND APPLY INVERSE
TRANSFORM TO TRANSFORM
COEFFICIENTS TO PRODUCE
RESIDUAL BLOCK

380

COMBINE PREDICTION BLOCK
AND RESIDUAL BLOCK

FIG. 9

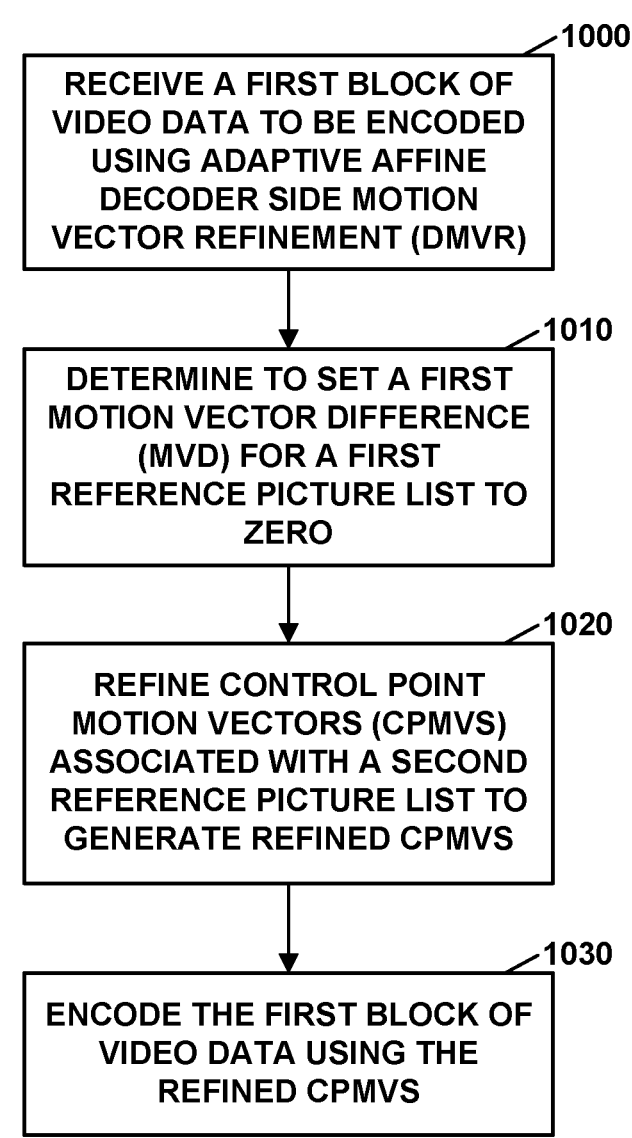

1000

RECEIVE A FIRST BLOCK OF
VIDEO DATA TO BE ENCODED
USING ADAPTIVE AFFINE
DECODER SIDE MOTION
VECTOR REFINEMENT (DMVR)

1010

DETERMINE TO SET A FIRST
MOTION VECTOR DIFFERENCE
(MVD) FOR A FIRST
REFERENCE PICTURE LIST TO
ZERO

1020

REFINE CONTROL POINT
MOTION VECTORS (CPMVS)
ASSOCIATED WITH A SECOND
REFERENCE PICTURE LIST TO
GENERATE REFINED CPMVS

1030

ENCODE THE FIRST BLOCK OF
VIDEO DATA USING THE
REFINED CPMVS

FIG. 10

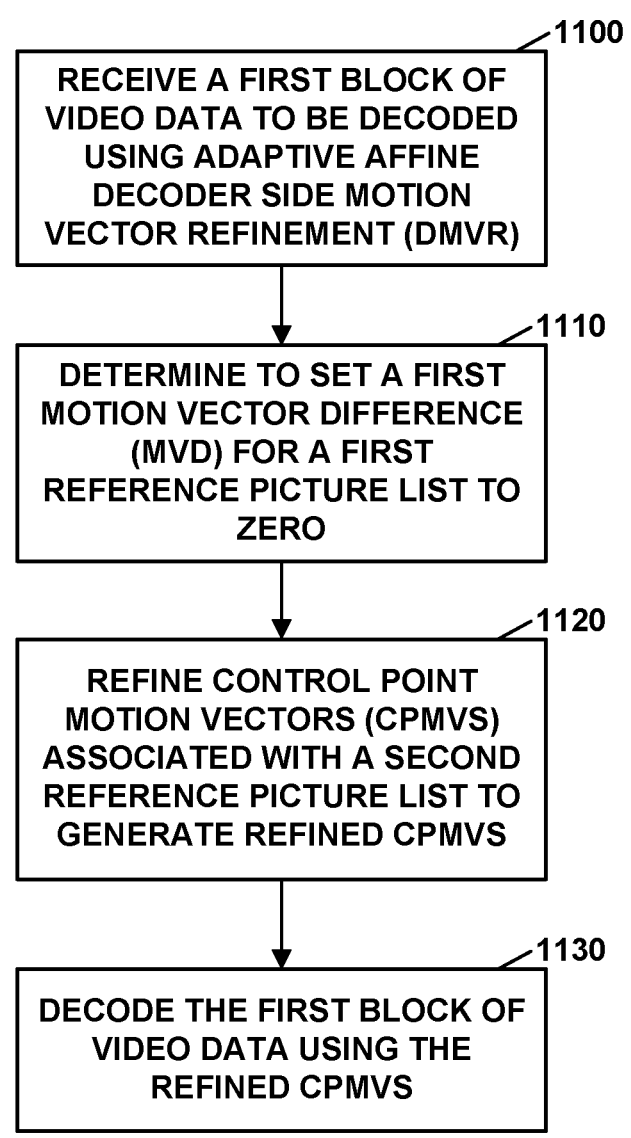

1100

RECEIVE A FIRST BLOCK OF VIDEO DATA TO BE DECODED USING ADAPTIVE AFFINE DECODER SIDE MOTION VECTOR REFINEMENT (DMVR)

1110

DETERMINE TO SET A FIRST MOTION VECTOR DIFFERENCE (MVD) FOR A FIRST REFERENCE PICTURE LIST TO ZERO

1120

REFINE CONTROL POINT MOTION VECTORS (CPMVS) ASSOCIATED WITH A SECOND REFERENCE PICTURE LIST TO GENERATE REFINED CPMVS

1130

DECODE THE FIRST BLOCK OF VIDEO DATA USING THE REFINED CPMVS

FIG. 11

ADAPTIVE BILATERAL MATCHING FOR DECODER SIDE AFFINE MOTION VECTOR REFINEMENT

This application claims the benefit of U.S. Provisional Patent Application No. 63/384,979, filed Nov. 25, 2022, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for encoding and decoding video data, including techniques for inter prediction. More specifically, this disclosure describes techniques for adaptive affine decoder side affine motion vector refinement (DMVR) using bilateral matching. In some examples of affine DMVR, both predictors are refined simultaneously. However, in certain cases, one of the predictors may already have a level of accuracy that is acceptable for coding efficiency, while coding efficiency may be improved by refining the other predictor.

This disclosure describes techniques for adaptive affine DMVR which allows further refinement flexibility with additional signaling. Compared to other affine DMVR techniques, the adaptive affine DMVR of this disclosure may include the setting of a motion vector difference of one of the reference picture lists to be zero (0, 0). In this way, instead of refining motion vectors from both reference lists simultaneously, only a motion vector of one of the predictors from a given reference list is refined. Accordingly, coding efficiency may be increased.

In one example, this disclosure describes a method of decoding video data, the method comprising receiving a first block of video data to be decoded using adaptive affine DMVR, determining to set a first motion vector difference (MVD) for a first reference picture list to zero, refining control point motion vectors (CPMVs) associated with a second reference picture list to generate refined CPMVs, and decoding the first block of video data using the refined CPMVs.

In another example, this disclosure describes an apparatus configured to decode video data, the apparatus comprising a memory, and one or more processors in communication with the memory, the one or more processors configured to receive a first block of video data to be decoded using adaptive affine DMVR, determine to set a first MVD for a first reference picture list to zero, refine CPMVs associated with a second reference picture list to generate refined CPMVs, and decode the first block of video data using the refined CPMVs.

In another example, this disclosure describes an apparatus configured to decode video data, the apparatus comprising means for receiving a first block of video data to be decoded using adaptive affine DMVR, means for determining to set a MVD for a first reference picture list to zero, means for refining CPMVs associated with a second reference picture list to generate refined CPMVs, and means for decoding the first block of video data using the refined CPMVs.

In another example, this disclosure describes a non-transitory computer-readable storage medium storing instructions that when executed causes one or more processors to receive a first block of video data to be decoded using adaptive affine DMVR, determine to set a first MVD for a first reference picture list to zero, refine CPMVs associated with a second reference picture list to generate refined CPMVs, and decode the first block of video data using the refined CPMVs.

In another example, this disclosure describes a method of encoding video data, the method comprising receiving a first block of video data to be encoded using adaptive affine DMVR, determining to set a first MVD for a first reference picture list to zero, refining CPMVs associated with a second reference picture list to generate refined CPMVs, and encoding the first block of video data using the refined CPMVs.

In another example, this disclosure describes an apparatus configured to encode video data, the apparatus comprising a memory, and one or more processors in communication with the memory, the one or more processors configured to receive a first block of video data to be encoded using adaptive affine DMVR, determine to set a first MVD for a first reference picture list to zero, refine CPMVs associated with a second reference picture list to generate refined CPMVs, and encode the first block of video data using the refined CPMVs.

In another example, this disclosure describes an apparatus configured to encode video data, the apparatus comprising means for receiving a first block of video data to be encoded using adaptive affine DMVR, means for determining to set a MVD for a first reference picture list to zero, means for refining CPMVs associated with a second reference picture list to generate refined CPMVs, and means for encoding the first block of video data using the refined CPMVs.

In another example, this disclosure describes a non-transitory computer-readable storage medium storing instructions that when executed causes one or more processors to receive a first block of video data to be encoded using adaptive affine DMVR, determine to set a first MVD for a first reference picture list to zero, refine CPMVs associated with a second reference picture list to generate refined CPMVs, and encode the first block of video data using the refined CPMVs.

The details of one or more examples are set forth in the accompanying drawings and the description below. Other features, objects, and advantages will be apparent from the description, drawings, and claims.

BRIEF DESCRIPTION OF DRAWINGS

FIG. 9 is a flowchart illustrating an example method for decoding a current block in accordance with the techniques of this disclosure.

FIG. 10 is a flowchart illustrating another example method for encoding a current block in accordance with the techniques of this disclosure.

FIG. 11 is a flowchart illustrating another example method for decoding a current block in accordance with the techniques of this disclosure.

DETAILED DESCRIPTION

In general, this disclosure describes techniques for encoding and decoding video data, including techniques for inter prediction. More specifically, this disclosure describes techniques for adaptive affine decoder side affine motion vector refinement (DMVR) using bilateral matching. In some examples of affine DMVR, both predictors are refined simultaneously. However, in certain cases, one of the predictors may already have a level of accuracy that is acceptable for coding efficiency, while coding efficiency may be improved by refining the other predictor.

This disclosure describes techniques for adaptive affine DMVR which allows further refinement flexibility with additional signaling. Compared to other affine DMVR techniques, the adaptive affine DMVR of this disclosure may include the setting of a motion vector difference of one of the reference picture lists to be (0, 0). In this way, instead of refining motion vectors from both reference lists simultaneously, only a motion vector of one of the predictors from a given reference list is refined. Accordingly, coding efficiency may be increased.

Figure 1:
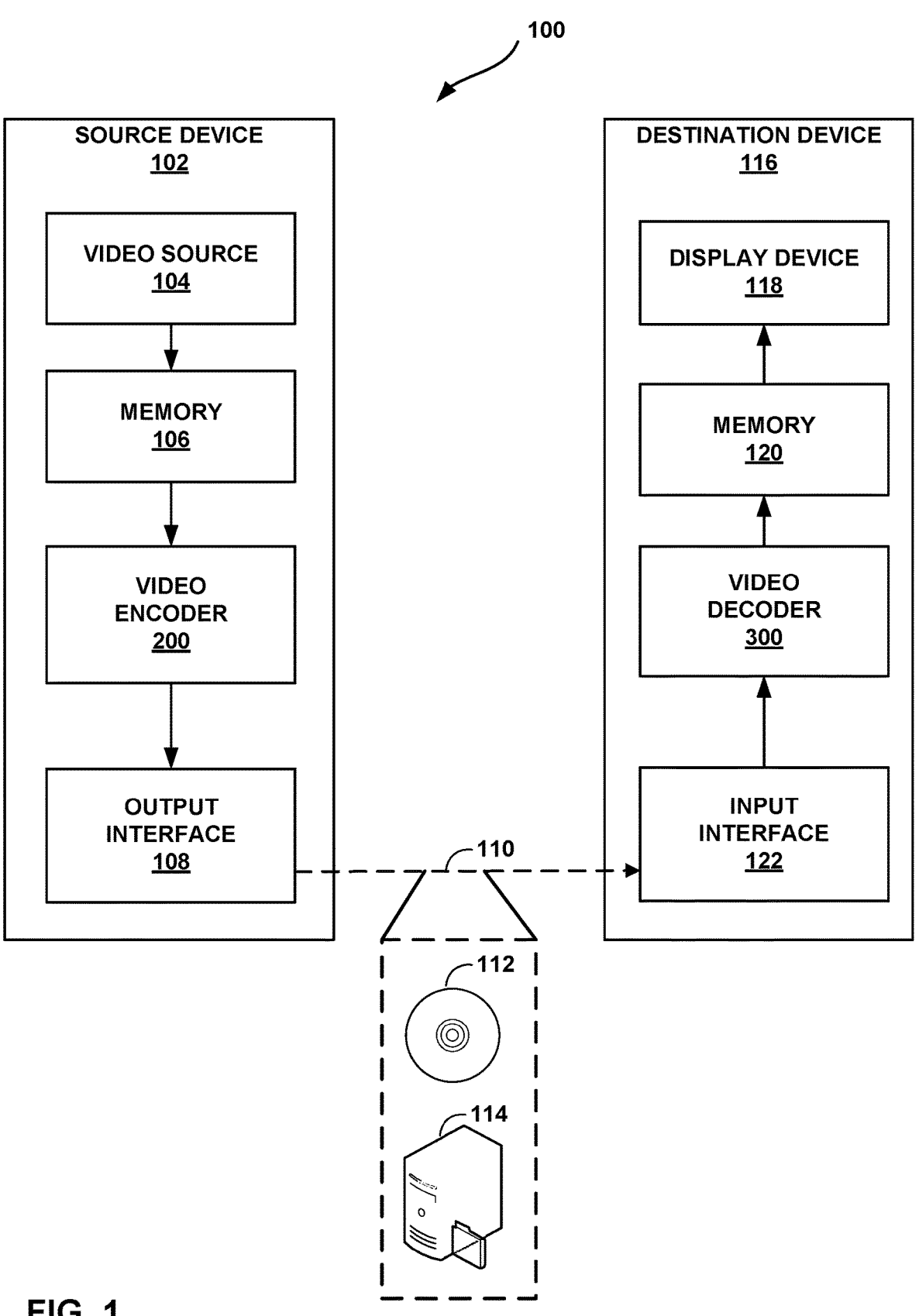
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for affine DMVR. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for affine DMVR. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use affine DMVR.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three subblocks. In some examples, a triple or ternary tree partition divides a block into three subblocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, as will be explained in more detail below, video encoder 200 and video decoder 300 may be configured to code video data using an adaptive affine DMVR mode. For example, video encoder 200 and video decoder 300 may be configured to receive a first block of video data to be coded using adaptive affine DMVR, determine to set a first motion vector difference (MVD) for a first reference picture list to zero, refine control point motion vectors (CPMVs) associated with a second reference picture list to generate refined CPMVs, and code the first block of video data using the refined CPMVs.

Bilateral Matching

Bilateral matching (BM) is a technique in which video encoder 200 and video decoder 300 may be configured to refine a pair of two initial motion vectors: MV0 and MV1. Generally, the BM technique includes searching around the area of a reference picture pointed to by MV0 and MV1 to derive refined MVs MV0' and MV1' that minimize a block matching cost. The block matching cost measures the similarity between the two motion compensated predictors generated by the two MVs. Some typical criterions for the block matching cost are sum of absolute difference (SAD), sum of absolute transformed difference (SATD), sum of square error (SSE), et al. The bilateral matching cost may also include a regularization term that is derived based on the MV differences between the current MV pair and the initial MV pair. Some certain constraints may also be applied to the MV differences (MVDs) between MVD0 (MV0'-MV0) and MVD1 (MV1'-MV1). Typically, BM is applied using the assumption that MVD0 and MVD1 shall be proportional to the temporal distances (TD) between the current picture and the reference pictures pointed by the two MVs. However, in some applications, BM is applied using the assumption that MVD0 is equal to −MVD1.

Affine Mode

An affine motion model can be described by the following equations:

$$\begin{cases} v_x = ax + by + e \\ v_y = cx + dy + f \end{cases},$$

wherein $(v_x, v_y)$ is the motion vector at the coordinate $(x, y)$, and a, b, c, d, e, and f are the six affine parameters. This disclosure will refer to the above affine motion model as a 6-parameter affine motion model.

In a typical video coder, a picture is partitioned into blocks for block-based coding. The affine motion model for a block can also be described by the three motion vectors (MVs) $\vec{v}_0 = (v_{0x}, v_{0y})$, $\vec{v}_1 = (v_{1x}, v_{1y})$, and $\vec{v}_2 = (v_{2x}, v_{2y})$ at three different locations that are not in the same line. The three locations are usually referred to as control points, and the three motion vectors are referred to as control point motion vectors (CPMVs). In the case when the three control-points are at three corners of a block, the affine motion can be described as follows:

$$\begin{cases} v_x = \frac{(v_{1x} - v_{0x})}{blkW}x + \frac{(v_{2x} - v_{0x})}{blkH}y + v_{0x} \\ v_y = \frac{(v_{1y} - v_{0y})}{blkW}x + \frac{(v_{2y} - v_{0y})}{blkH}y + v_{0y} \end{cases},$$

wherein blkW and blkH are the width and height of the block.

In affine mode, different motion vectors can be derived for each pixel in the block according to the associated affine motion model. Therefore, motion compensation can be performed in pixel-by-pixel fashion. However, to reduce the complexity of affine mode, subblock based motion compensation may be used, wherein the block is partitioned into multiple subblocks (where each subblock has a smaller block size that then original block) and each subblock is associated with one motion vector for block-based motion compensation. The motion vector for each subblock is derived using the representative coordinate of the subblock. Typically, the center position is used as the representative coordinate.

In one example, a block is partitioned into non-overlapping subblocks. The block width is blkW, the block height is blkH, the subblock width is sbW, and the subblock height is sbH. In this example, there are blkH/sbH rows of subblocks and blkW/sbW subblocks in each row. For a six-parameter affine motion model, the motion vector for the subblock (referred to as subblock MV) at $i_{th}$ row (0<=i<blkW/sbW) and $j_{th}$ (0<=j<blkH/sbH) column is derived as follows:

$$\begin{cases} v_x = \frac{(v_{1x} - v_{0x})}{blkW}\left(j * sbW + \frac{sbW}{2}\right) + \frac{(v_{2x} - v_{0x})}{blkH}\left(i * sbH + \frac{sbH}{2}\right) + v_{0x} \\ v_y = \frac{(v_{1y} - v_{0y})}{blkW}\left(j * sbW + \frac{sbW}{2}\right) + \frac{(v_{2y} - v_{0y})}{blkH}\left(i * sbH + \frac{sbH}{2}\right) + v_{0y} \end{cases}$$

The subblock motion vectors (MVs) are rounded to the predefined precision and stored in the motion buffer for motion compensation and motion vector prediction.

A simplified 4-parameter affine model (for zoom and rotational motion) is described as follows:

$$\begin{cases} v_x = ax - by + e \\ v_y = bx + ay + f \end{cases}$$

Similarly to the 6-parameter affine model, the 4-parameter affine model for a block can be described by two CPMVs: $\vec{v}_0 = (v_{0x}, v_{0y})$ and $\vec{v}_1 = (v_{1x}, v_{1y})$ at two corners (typically top-left and top-right) of the block. The motion field is then described as follows:

$$\begin{cases} v_x = \frac{(v_{1x} - v_{0x})}{blkW}x - \frac{(v_{1y} - v_{0y})}{blkW}y + v_{0x} \\ v_y = \frac{(v_{1y} - v_{0y})}{blkW}x + \frac{(v_{1x} - v_{0x})}{blkW}y + v_{0y} \end{cases}$$

The subblock motion vector (MV) at $i_{th}$ row and $j_{th}$ column is derived as follows:

$$\begin{cases} v_x = \frac{(v_{1x} - v_{0x})}{blkW}\left(j * sbW + \frac{sbW}{2}\right) - \frac{(v_{1y} - v_{0y})}{blkW}\left(i * sbH + \frac{sbH}{2}\right) + v_{0x} \\ v_y = \frac{(v_{1y} - v_{0y})}{blkW}\left(j * sbW + \frac{sbW}{2}\right) + \frac{(v_{1x} - v_{0x})}{blkW}\left(i * sbH + \frac{sbH}{2}\right) + v_{0y} \end{cases}$$

DMVR in VVC

Figure 2:
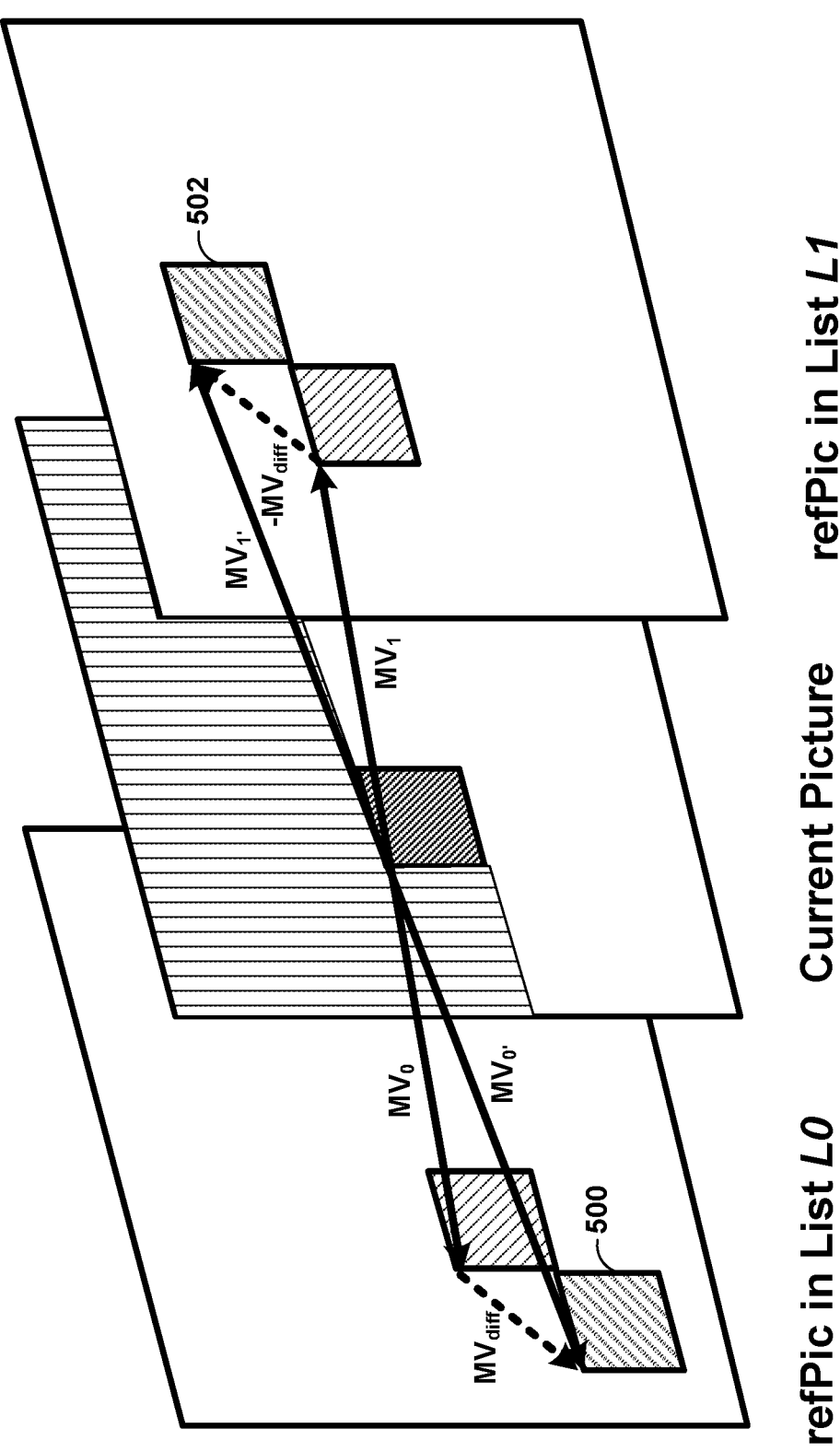
FIG. 2 is a conceptual diagram illustrating an example of bilateral matching.

In VVC, a BM based DMVR may be used by video encoder 200 and video decoder 300 to increase the accuracy of the MVs of a bi-prediction merge candidate. The BM-based DMVR method calculates the SAD between the two candidate blocks in the reference picture list L0 and list L1. FIG. 2 is a conceptual diagram illustrating an example of bilateral matching. As illustrated in FIG. 2, video encoder 200 and video decoder 300 may be configured to calculate the SAD between block 500 and block 502 based on each MV candidate around the initial MV. The SAD may be referred to as a distortion cost calculation or a bilateral matching cost calculation. The MV candidate with the lowest SAD becomes the refined MV and is used to generate the bi-predicted signal. In some examples, the SAD of the initial MVs is subtracted by ¼ of the SAD value to serve as a regularization term. In the example of FIG. 2, the temporal distances (e.g., the Picture Order Count (POC) difference) from the two reference pictures to the current picture shall be the same, therefore, the motion vector difference of MV0 (MVD0) is just the opposite sign of the motion vector difference of MV1 (MVD1).

The refinement search range is two integer luma samples from the initial MV. The searching includes the integer sample offset search stage and fractional sample refinement stage. A 25 points full search is applied for integer sample offset searching. The SAD of the initial MV pair is first calculated. If the SAD of the initial MV pair is smaller than a threshold, the integer sample stage of DMVR is terminated. Otherwise, the SADs of the remaining 24 points are calculated and checked in raster scanning order. The point with the smallest SAD is selected as the output of integer sample offset searching stage.

The integer sample search is followed by fractional sample refinement. To reduce calculational complexity, the fractional sample refinement may be derived by using parametric error surface equation, instead of additional searching with SAD comparison. In one example, the fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x,y)=A(x-x_{min})^2+B(y-y_{min})^2+C, \quad (1)$$

where $(x_{min}, y_{min})$ corresponds to the fractional position with the least cost and C corresponds to the minimum cost value. Solving the above equations using the cost value of the five search points, the $(x_{min}, y_{min})$ is computed as:

$$x_{min}=(E(-1,0)-E(1,0))/(2(E(-1,0)+E(1,0)-2E(0,0))) \quad (2)$$

$$y_{min}=(E(0,-1)-E(0,1))/(2((E(0,-1)+E(0,1)-2E(0,0))) \quad (3)$$

The value of $x_{min}$ and $y_{min}$ are automatically constrained to be between −8 and 8 since all cost values are positive and the smallest value is E(0,0). This corresponds to a half pel offset with ¹⁄₁₆th-pel MV accuracy in VVC. The computed fractional $(x_{min}, y_{min})$ are added to the integer distance refinement MV to get the sub-pixel accurate refinement delta MV.

In VVC, the resolution of the MVs is ¹⁄₁₆ luma samples. The samples at the fractional position are interpolated using a 8-tap interpolation filter. In DMVR, the search points surround the initial fractional-pel MV with integer sample offset, therefore the samples of those fractional position are interpolated for DMVR search process. To reduce the calculation complexity, a bi-linear interpolation filter is used to generate the fractional samples for the searching process in DMVR. Another effect is that by using a bi-linear filter with a 2-sample search range, the DVMR process does not access more reference samples compared to the normal motion compensation process. After the refined MV is obtained with the DMVR search process, the normal 8-tap interpolation filter is applied to generate the final prediction. In order to not access more reference samples compared to the normal motion compensation process, the samples, which are not needed for the interpolation process based on the original MV but are needed for the interpolation process based on the refined MV, may be padded from those available samples.

When the width and/or height of a CU is larger than 16 luma samples, the CU may be further split into subblocks with a width and/or height equal to 16 luma samples for the DMVR process.

In VVC, DMVR can be applied for the CUs which are coded with following modes and features:

CU level merge mode with bi-prediction MV

One reference picture is in the past and another reference picture is in the future with respect to the current picture The distances (i.e., POC difference) from two reference pictures to the current picture are same Both reference pictures are short-term reference pictures CU has more than 64 luma samples Both CU height and CU width are larger than or equal to 8 luma samples Bi-Prediction with CU-level Weights (BCW) weight index indicates equal weight Weighted prediction (WP) is not enabled for the current block Combined inter-intra prediction (CIIP) mode is not used for the current block Adaptive DMVR The general idea of adaptive DMVR is to configure video encoder 200 and video decoder 300 to use different search strategies and/or methods for different coded blocks for bilateral matching. The selected search strategy for a block is signaled as one or more syntax element(s) that are coded in the bitstream. The search strategy includes the constraint/relationship between MVD0 and MVD1 that is imposed during the bilateral matching search process.

One of the following constraints between MVD0 and MVD1 is selected per bilateral matching block:

1) Mirroring MVD: MVD0 and MVD1 have the same magnitude, but opposite sign, i.e., MVD0=−MVD1 (regular DMVR);

2) MVD0 is zero (both x and y components are zero), i.e., MV0 is fixed while searching is performed around MV1 to derive the refined MV1', and MV0' is equal to MV0 (adaptive DMVR);

3) MVD1 is zero, i.e., MV1 is fixed while searching is performed around MV0 to derive the refined MV0', and MV1' is equal to MV1 (adaptive DMVR).

Video encoder 200 may signal a first syntax element representing the mode information (e.g., whether regular DMVR or adaptive DMVR shall be applied). The above mentioned three options are classified by the first syntax element. Option 1) applies regular DMVR to a coded block when a regular merge candidate satisfies the DVMR conditions and option 2) or 3) is applied when the coded block uses the designated new merge mode wherein all candidates shall also meet the designated DMVR conditions. Constraint 2) and 3) are further distinguished by a mode flag or merge index.

DMVR for Affine Merge Mode

The affine DMVR design can be summarized in the following steps:

1) Divide a current block into subblocks.

2) Generate initial motion vectors (of both prediction directions) for each subblock (subblock motion fields) according to the initial affine motion model.

3) Loop over each subblock, calculating a subblock bilateral matching cost for all possible offsets.

4) For each possible offset, accumulate the subblock bilateral matching cost to generate the bilateral matching cost corresponding to the entire block.

5) Determine the best offset by selecting the one with the minimum bilateral matching cost corresponding to the entire block.

In this way, the subblock motion fields is generated only once instead of for each candidate offset.

The subblock size in the above process is determined based on the affine parameters. Affine parameters reflect the per pixel motion vector change in an affine coded block. Generally, a larger subblock size is used when the affine parameters are small and vice versa.

Given the offset and initial motion vectors (generated in step 2 above), the candidate motion vectors can be derived. Pre-interpolation is applied to generate predictors for all possible offsets in one step, which reduces the complexity. Bilinear interpolation is used instead of 8-tap (6-tap, or 12-tap) interpolation filters that are typically used for final motion compensation.

Parametric error surface based sub-pixel offsets estimation is also applied after step 5) to generate the sub-pixel offset.

In Jie Chen, et. al. "EE2-2.6: DMVR for affine merge coded blocks," Joint Video Experts Team (JVET) of ITU-T SG 16 WP 3 and ISO/IEC JTC 1/SC 29, 28$^{th}$ Meeting, Mainz, DE, 20-28 Oct. 2022 (hereinafter, "JVET-AB0112"), affine DMVR techniques that follow the above-mentioned procedures was proposed.

In Han Huang, et. al., "EE2-related Sub-block processing for affine DMVR," Joint Video Experts Team (JVET) of ITU-T SG 16 WP 3 and ISO/IEC JTC 1/SC 29, 28$^{th}$ Meeting, Mainz, D E, 20-28 Oct. 2022 (hereinafter, "JVET-AB0177"), certain simplifications of affine DMVR were described. For example, instead of using each of the subblock in affine DMVR, only a subset of subblocks are used. In addition, regression-based affine merge candidate derivation method may be further applied based on the affine DMVR search results.

Figure 3:
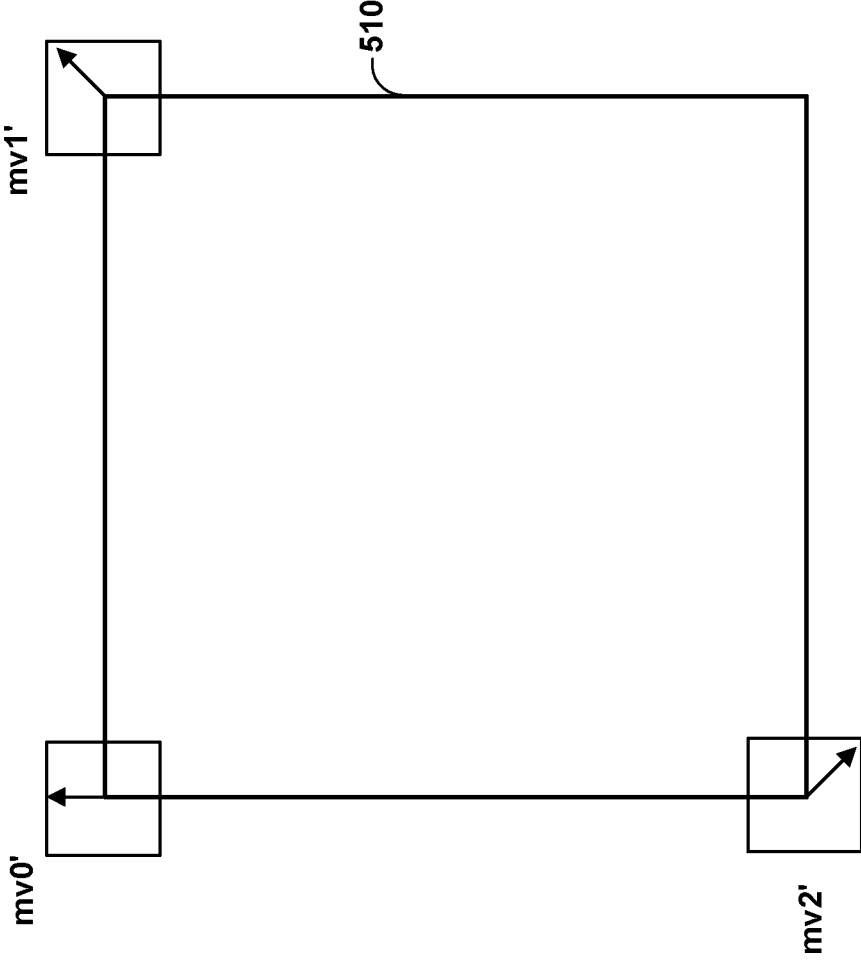
FIG. 3 is a conceptual diagram illustrating an example of independent bilateral matching search for control point motion vectors.

In Han Huang, et. al., "EE2-related: Control-point motion vector refinement for Affine DMVR," Joint Video Experts Team (JVET) of ITU-T SG 16 WP 3 and ISO/IEC JTC 1/SC 29, 28$^{th}$ Meeting, Mainz, DE, 20-28 Oct. 2022 (hereinafter, "JVET-AB0178"), a CPMV based affine DMVR search method was described. Given initial control-point motion vectors initCpMvLX[cpIdx] with cpIdx=0 . . . numCpMv−1, wherein the numCpMv is the number of CPMVs of the current affine coding block. The proposed method can be described in the following steps:

1) For each control-point, perform bilateral matching for a block 510 that is centered by the control-points in order to derive the refined CPMVs bmRefinedCpMvLx [cpIdx], as illustrated in FIG. 3. FIG. 3 is a conceptual diagram illustrating an example of independent bilateral matching search for control point motion vectors.

2) Loop over the combinations of initCpMvLX[cpIdx] and bmRefinedCpMvLx[cpIdx], and derive a best set of CPMVs that minimizes the bilateral matching cost of the current block.

3) Iteratively further refine the CPMVs to minimize the bilateral matching cost of the current block. In each iteration, one CPMV is refined while the others are fixed.

Adaptive Reordering of Merge Candidates (ARMC)

In the currently studied Enhanced Compression Model (ECM), merge candidates are adaptively reordered with template matching (TM). The reordering method is applied to a regular merge candidate list, a TM merge candidate list, and an affine merge candidate list (subblock merge candidate list excluding the subblock temporal motion vector predictor (SbTMVP) candidate). In some examples of ECM, multiple SbTMVP candidates may be included in a candidate list, and these multiple SbTMVP candidates may be reordered using an ARMC process. For the TM merge mode, merge candidates are reordered before the TM refinement process.

After a merge candidate list is constructed, the TM cost of a merge candidate is measured by the sum of absolute differences (SAD) between samples of a template of the current block and their corresponding reference samples. The template of current block comprises a set of reconstructed samples neighboring to the current block. Reference samples of the template are located by the motion information of the merge candidate.

Figure 4:
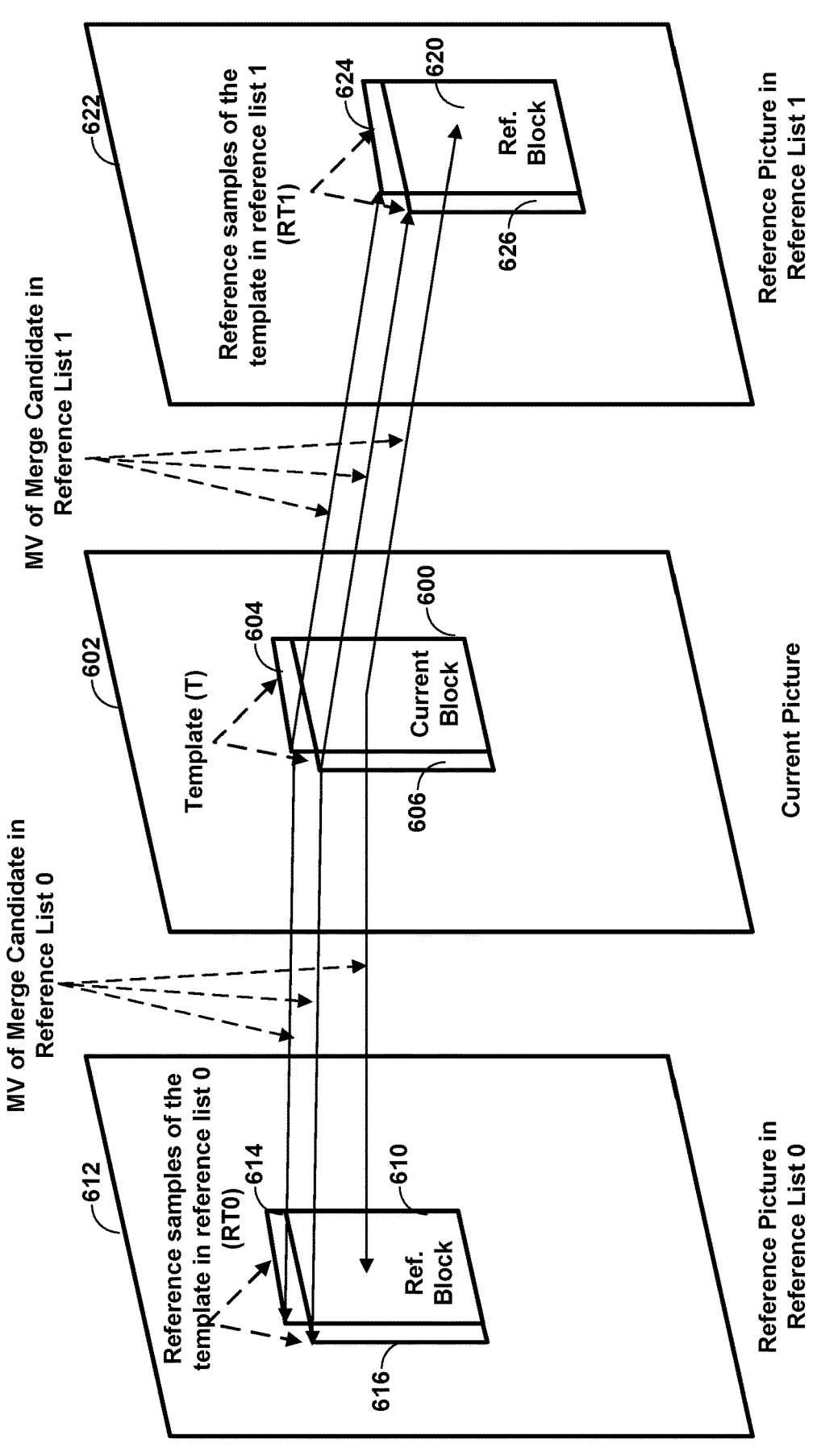
FIG. 4 is a conceptual diagram illustrating example template and references samples of a template in reference pictures.

When a merge candidate utilizes bi-directional prediction, the reference samples of the template of the merge candidate are also generated by bi-prediction, as shown in FIG. 4. FIG. 4 is a conceptual diagram illustrating example template and references samples of a template in reference pictures. Current block 600 of current picture 602 has an above template 604 and a left template 606. Reference block 610 of reference picture 612 in reference list 0 is identified using the motion vector of a merge candidate in reference list 0. Reference samples of the above template 614 and the left template 616 are obtained (RT0). Similarly, reference block 620 of reference picture 622 in reference list 1 is identified using the motion vector of a merge candidate in reference list 1. Reference samples of the above template 624 and the left template 626 are obtained (RT1). The RT0 reference samples and the RT1 references are combined and averaged to obtain a single template. A sum of absolute differences (SAD) may be computed between the current template T and the single template formed from the RT0 and RT1 samples. Video encoder 200 and video decoder 300 may use the SAD value to determine if the templates are good match.

Figure 5:
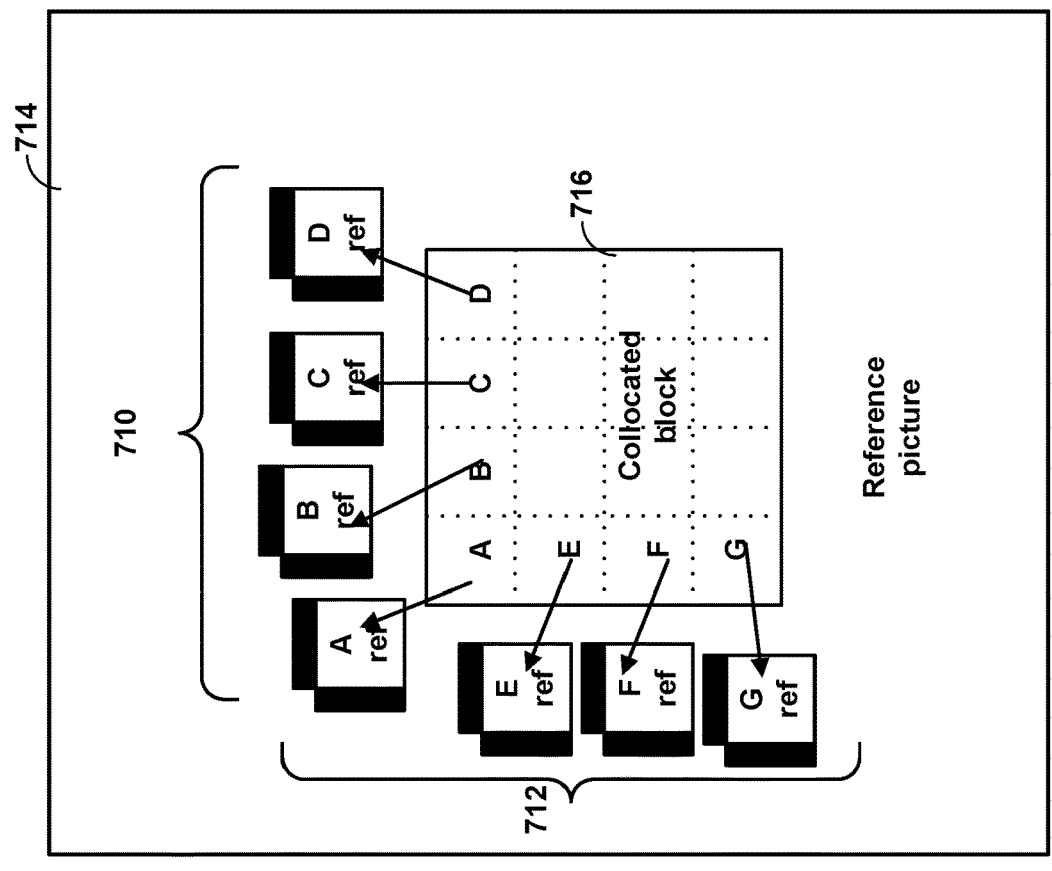
FIG. 5 is a conceptual diagram illustrating example template and reference samples of a template for a block with subblock motion.
Figure 5:
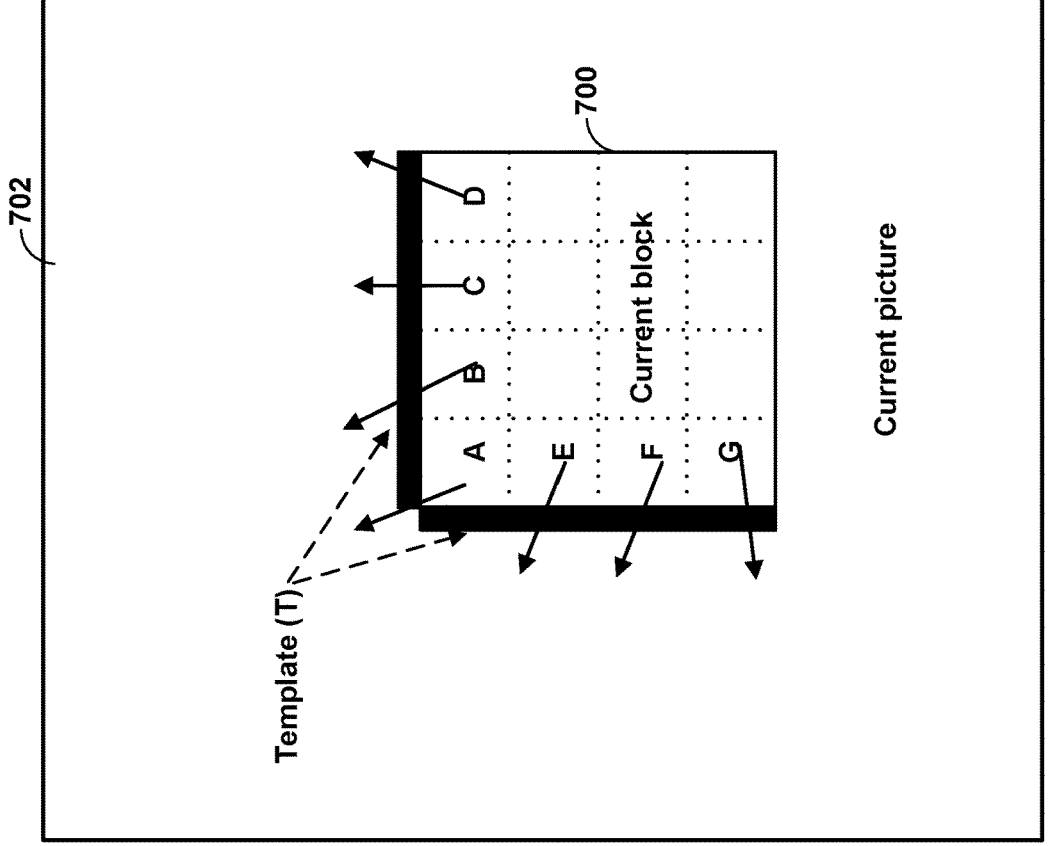

For sub-block-based merge candidates with sub-block size equal to Wsub×Hsub, the above template comprises of several sub-templates with the size of Wsub×1, and the left template comprises several sub-templates with the size of 1×Hsub. FIG. 5 is a conceptual diagram illustrating example templates and reference samples for sub-block motion. As shown in FIG. 5, the motion information of the sub-blocks in the first row (A, B, C, D) and the first column (A, E, F, G) of current block 700 of current picture 702 is used to derive the reference samples of each sub-templates 710 and 712. Sub-templates 710 are represented by the black boxes above the reference blocks A ref, B ref, C ref, and D ref in reference picture 714. The reference blocks of sub-templates 710 are identified by the motion vectors of the sub-bocks A, B, C, D relative to collocated block 716. Sub-templates 712 are represented by the black boxes to the left the reference blocks A ref, E ref, F ref, and G ref in reference picture 714. The reference blocks of sub-templates 712 are identified by the motion vectors of the sub-bocks A, E, F, G relative to collocated block 716.

Based on the TM cost of each merge candidates, the merge candidate list is reordered in ascending order.

Adaptive Affine DMVR General Example

In this disclosure, video encoder 200 and video decoder 300 may be configured to code video data according to an adaptive affine DMVR process. The adaptive affine DMVR of this disclosure allows further refinement flexibility for affine DMVR with additional signaling. Compared to other affine DMVR techniques, the general idea of adaptive affine DMVR of this disclosure is to set the MVD of one of the reference lists to be (0, 0). In this way, instead of refining both reference lists simultaneously, only one of the predictors from a given reference list is refined.

Adaptive affine DMVR may be an extension of the regular adaptive DMVR method described above. However, when refining the MVD to determine refined CPMVs, the BM cost is derived for each of the subblocks instead of the whole CU and the BM cost is accumulated for each of the subblocks for the final cost to determine the best MVD. Additional coding benefits can be observed since in some cases one of the predictors might already be accurate and only the other predictors need to be refined. Together with the original affine decoder side motion vector refinement, for each affine merge candidate that meets the DMVR condition, in one example, a total of three different refinement options can be provided:

1) Original affine DMVR-MVDs are mirrored: MVD0 and MVD1 have the same magnitude, but opposite signs, i.e., MVD0=−MVD1;

2) Adaptive affine DMVR 1-MVD0 is zero (both x and y components are zero). For each subblock in affine CU, MV0 is fixed while the BM cost is derived within the search range of MV1. The accumulated BM cost is used to determine the final MVD1 for each CPMV of reference list 1;

3) Adaptive affine DMVR 2-MVD1 is zero (both x and y components are zero). For each subblock in affine CU, MV1 is fixed while the BM cost is derived within the search range of MV0. The accumulated BM cost is used to determine the final MVD0 for each CPMV of reference list 0.

With the introduction of multiple refinement options, signaling of additional syntax may be used. In one example, video encoder 200 may encode a first syntax element to indicate whether option 1) is used (e.g., affine DMVR with mirrored MVDs). If the first syntax indicates option 1) is not used, video encoder 200 may encode a second syntax element to indicate whether option 2) or 3) is used (MVD0 is zero or MVD1 is zero). Video decoder 300 may decode and parse the first and second syntax elements to determine the type of affine DMVR decoding to perform.

In a general example of the disclosure, video encoder 200 and video decoder 300 may receive a block of video data to be coded (e.g., encoded or decoded) using adaptive affine DMVR. Video encoder 200 and video decoder 300 may determine to set a first MVD for a first reference picture list to zero. In one example, the first MVD is MVD0, the first reference picture list is reference picture list 0, the second MVD is MVD1, and the second reference picture list is reference picture list 1. In another example, the first reference picture list is reference picture list 1, the second MVD is MVD0, and the second reference picture list is reference picture list 0.

Video encoder 200 and video decoder 300 may be configured to code a first syntax element indicating that the first block of video data is to be decoded using adaptive affine DMVR (e.g., according to options 2) and 3) above). In one example, to determine to set the first MVD for the first reference picture list to zero, video decoder 300 may decode a second syntax element that indicates to set the first MVD for the first reference picture list to zero. In this example, the second syntax element indicates if the first reference picture list is reference picture list 0 or reference picture list 1.

Video encoder 200 and video decoder 300 may then refine CPMVs associated with a second reference picture list to generate refined CPVMs. To perform the refinement, video encoder 200 and video decoder 300 may refine a second MVD for the second reference picture list using the affine DMVR techniques described above, or any of the affine DMVR techniques described below. For example, video encoder 200 and video decoder 300 may determine, for each subblock in the first block of video data, a bilateral matching (BM) cost within a search range of a motion vector, accumulate the BM cost for a plurality of subblocks of the first block of video data to generate an accumulated BM cost, determine a second MVD for the CPMVs of the second reference picture list based on the accumulated BM cost, and determine the refined CPMVs based on the second MVD.

Video encoder 200 and video decoder 300 may then code the first block of video data using the refined CPMVs. In this context, the coding is bi-directional coding. The refined CPMVs are used for the second reference picture list, while original CPMVs (e.g., because the first MVD is set to zero) are used for the first reference picture list.

Syntax Signaling

In one example, video encoder 200 may be configured to signal the adaptive affine DMVR mode (adaptive_aff_bm_mode) described above as an additional affine merge mode to the regular affine merge mode. Various signaling methods may be applied. In one example, the adaptive_aff_bm_mode is considered as one variant of regular affine merge mode. Video encoder 200 may first signal syntax elements to indicate the regular merge mode, then an additional flag is signaled to indicate whether the merge mode is the adaptive_aff_bm_mode.

In another example, video encoder 200 may signal a first flag to indicate if regular affine merge mode is used. Video encoder 200 may further signal a second flag to indicate if the affine merge candidate is an affine MMVD candidates. In this example, the adaptive_aff_bm_mode is signaled after the affine MMVD flag to indicate if regular affine merge candidate or adaptive affine merge candidates shall be derived.

In another example, adaptive_aff_bm_mode is indicated by a flag prior to the indication of regular affine merge mode. If the syntax indicates the current block is not using adaptive_aff_bm_mode, then other syntax elements are signaled to indicate whether the merge mode is regular affine merge mode or affine MMVD mode.

Video encoder 200 may signal the merge index in adaptive_aff_bm_mode using the same signaling method as in regular affine merge mode. In one example, the same context models are used to code the merge index. In another example, separate context models are used if the mode is adaptive_aff_bm_mode. The maximum number of merge candidate may be different for adaptive_aff_bm_mode and regular affine merge mode.

Some high level syntax elements may be used to indicate whether adaptive_aff_bm_mode can be applied. In one example, the same high level syntax that control the on/off of regular affine DMVR is also used to control the on/off of adaptive_aff_bm_mode. In another example, separate high level syntax is used to control the on/off of adaptive_aff_bm_mode. In another example, separate high level syntax is used to control the on/off of adaptive_aff_bm_mode, but the high level syntax is present only if the regular affine DMVR is enabled. If the high level syntax of regular DMVR indicates the regular affine DMVR is off, then the high level syntax for adaptive_aff_bm_mode on/off control is not signaled and is inferred to be off. The signaling of the corresponding high level syntax can be in the SPS, PPS, picture header, slice header or other syntax structure.

Syntax Signaling Reduction

The signaling of above-mentioned syntax can be saved (e.g., not signaled) in some examples. Instead, either TM cost information or BM cost information can be used to determine the use of adaptive affine DMVR. To save the signaling of the second syntax, in one example, before performing affine DMVR or adaptive affine DMVR, two TM costs are derived. Define the TM cost between the template of current block and the template of predictor from reference list 0 as TM0 and the TM cost between the template of current block and the template of predictor from reference list 1 as TM0. If TM1<TM0, then only option 1) and 2) are examined and only one syntax is needed to indicate which option is used. Otherwise, only option 1) and 3) are examined and similarly also only one syntax is needed.

In a second example, all three options are first examined. Then with the refined affine motion vectors, the bi-predicted reference template is derived and the TM cost between the current template and bi reference template are computed for both option 2) and 3). By comparing the TM cost of option 2) and 3) one of the options is opted out and hence only one syntax element needs to be signaled.

In a third example, instead of using TM cost as in the second example, the minimum BM cost in the adaptive affine DMVR refinement search process is used and compared between option 2) and 3) to decide which of the option will be used. With the exclusion of one of the options, the number of syntaxes needed is reduced from 2 to 1.

The first syntax signaling can also be saved by using either TM cost or BM cost. In one example, the minimum BM cost of all the 3 options during the DMVR search process is recorded. After all the 3 options are examined, only the option with the minimum BM cost is preserved. In yet another example, instead of using the BM cost, TM cost is used to decide which one among the 3 options will be kept.

Alternative Affine Merge List for Adaptive Affine DMVR

For adaptive affine DMVR, as there is already a first syntax element to indicate whether affine DMVR or adaptive affine DMVR will be applied, a separate affine merge list which only includes affine merge candidates that meet the affine DMVR conditions may be constructed. In one example, after affine merge list is constructed, those candidates that meet the adaptive affine DMVR conditions may be added to a separate list which is only used for adaptive affine DMVR process. By excluding those candidates that are either uni-predicted or do not satisfy the adaptive affine DMVR conditions, the merge index to be signaled will potentially be smaller and hence signaling overhead can be reduced. ARMC may be further applied to the adaptive affine merge list before refining each of the candidates to further reduce the signaling overhead.

In a second example, the adaptive affine merge candidates are alternatively added to the adaptive bilateral matching regular merge candidates list. When scanning to construct adaptive bilateral matching regular merge candidates list, an affine flag is additionally checked. If the neighboring coded block is coded in affine mode, instead of adding a translational inter merge candidate, the affine merge candidate is added alternatively. Consequently, depending on whether the merge candidate is a translational inter merge candidate or affine merge candidates, adaptive DMVR or affine adaptive DMVR process may be applied correspondingly.

When an alternative merge list is used for adaptive affine DMVR, the second syntax element can also be saved using the same method as mentioned above using. e.g., TM cost. Additionally, the merge index to be signaled can also be modified to be smaller based on TM or BM cost. For example, in one example, an adaptive affine merge list with list size M is constructed. With the two adaptive affine DMVR options 2) and 3), a total of 2M refined candidates can be generated. These 2M candidates can be gathered into a single list and using the TM cost to perform ARMC reordering and only the first M candidates in the list is kept. In this way, we can skip the signaling of the second syntax element and signal a smaller merge index.

Alternative Search Pattern

In affine DMVR, a square search pattern is used for integer search and parametric error surface is followed for sub-pel search. For adaptive affine DMVR, in one example, the same search pattern is used. In a second example, a full search is used instead. For sub-pel search, in one example, the same parametric error surface method is used. In a second example, the diamond search pattern is used. In yet a third example, the sub-pel search is skipped.

Alternative Search Range

In one example of affine DMVR, the search range is set to be 3 pels. In one example, the same search range is used for the adaptive affine DMVR techniques of this disclosure as is used for affine DMVR. In another example, an alternative search range is used for adaptive affine DMVR only, for example, 4 pels.

Alternative Cost Metrics

In affine DMVR, either SAD or mean-removed SAD (MRSAD) is used depending on the block size. For adaptive affine DMVR alternative cost metrics can be used instead. In one example, SATD is used instead. In a second example, SSE is used. In other examples, the adaptive DMVR techniques use the same cost measures as affine DMVR, including SAD, MRSAD, SATD, or SSE.

Combination with Affine DMVR and Further Refinement

As described above, different affine DMVR designs may be applied to a picture of video data. Adaptive affine DMVR generally follows the same procedure in refining affine merge candidates with the difference in adding the MVD to compute the BM cost. Accordingly, in one example, the adaptive affine DMVR uses the same design as affine DMVR, e.g., both use the design from JVET-AB0177. In yet another example, the affine DMVR uses the design from JVET-AB0112 while the adaptive affine DMVR uses the design from JVET-AB0177.

Also, as described above, further improvement after affine DMVR may be possible. The similar further refinement scheme can also be applied to adaptive affine DMVR. In one example, regression-based affine merge candidate derivation method is applied on the adaptive affine DMVR output. In yet another example, the CPMV-based affine DMVR search method is applied on the adaptive affine DMVR result. In another example, both the further refinement methods are applied sequentially on top of adaptive affine DMVR.

Figure 6:
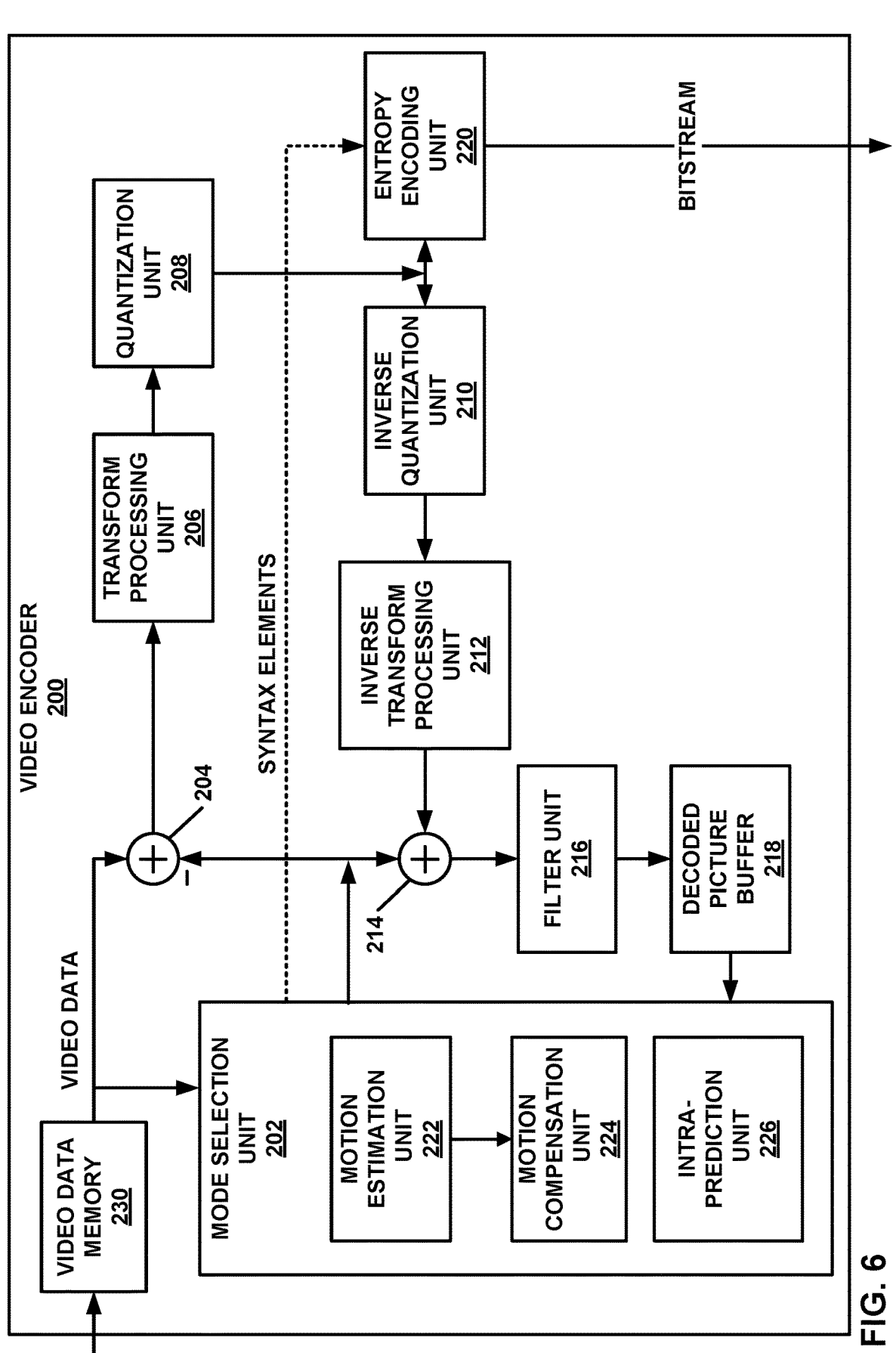
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

Motion estimation unit 222 and motion compensation unit 224 may also be configured to perform one or more techniques of this disclosure relating to adaptive affine DMVR. For example, motion estimation unit 222 and motion compensation unit 224 may be configured to receive a first block of video data to be encoded using adaptive affine DMVR, determine to set a first MVD for a first reference picture list to zero, refine CPMVs associated with a second reference picture list to generate refined CPMVs, and encode the first block of video data using the refined CPMVs.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to receive a first block of video data to be encoded using adaptive affine DMVR, determine to set a first MVD for a first reference picture list to zero, refine CPMVs associated with a second reference picture list to generate refined CPMVs, and encode the first block of video data using the refined CPMVs.

Figure 7:
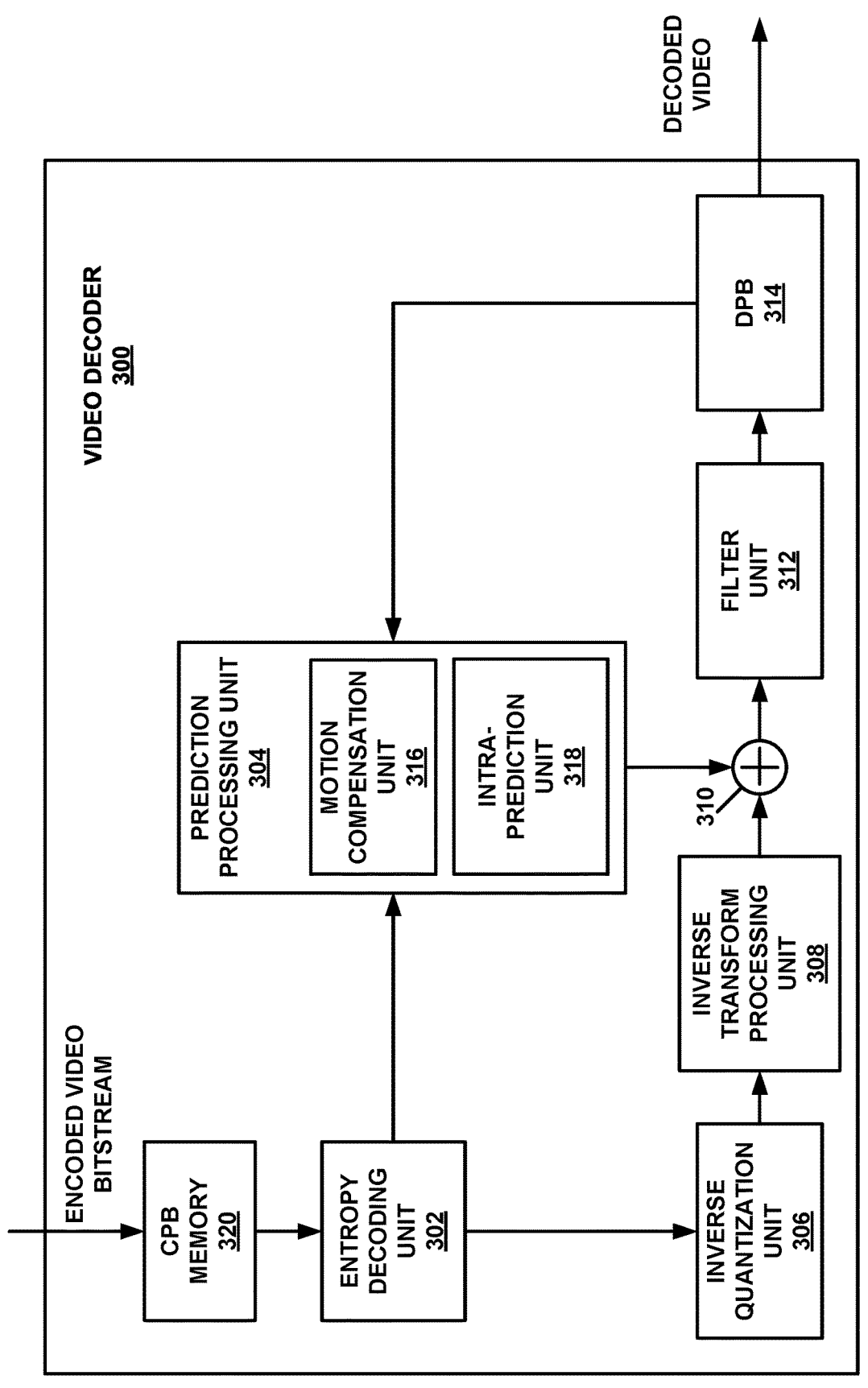
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

Motion compensation unit 316 may also be configured to perform one or more techniques of this disclosure relating to adaptive affine DMVR. For example, motion compensation unit 316 may be configured to receive a first block of video data to be decoded using adaptive affine DMVR, determine to set a first MVD for a first reference picture list to zero, refine CPMVs associated with a second reference picture list to generate refined CPMVs, and decode the first block of video data using the refined CPMVs.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured receive a first block of video data to be decoded using adaptive affine DMVR, determine to set a first MVD for a first reference picture list to zero, refine CPMVs associated with a second reference picture list to generate refined CPMVs, and decode the first block of video data using the refined CPMVs.

Figure 8:
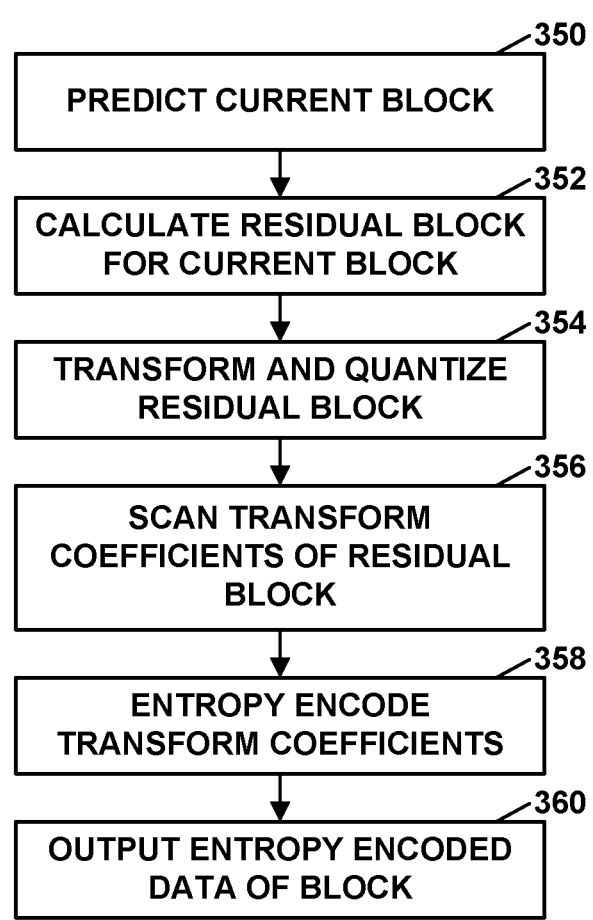
FIG. 8 is a flowchart illustrating an example method for encoding a current block in accordance with the techniques of this disclosure.

FIG. 8 is a flowchart illustrating an example method for encoding a current block in accordance with the techniques of this disclosure. The current block may be or include a current CU. Although described with respect to video encoder 200 (FIGS. 1 and 6), it should be understood that other devices may be configured to perform a method similar to that of FIG. 8.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

FIG. 9 is a flowchart illustrating an example method for decoding a current block of video data in accordance with the techniques of this disclosure. The current block may be or include a current CU. Although described with respect to video decoder 300 (FIGS. 1 and 7), it should be understood that other devices may be configured to perform a method similar to that of FIG. 9.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

FIG. 10 is a flowchart illustrating another example method for encoding a current block in accordance with the techniques of this disclosure. The techniques of FIG. 10 may be performed by one or more structural components of video encoder 200, including motion estimation unit 222 and motion compensation unit 224.

In one example, video encoder 200 may receive a first block of video data to be encoded using adaptive affine decoder side motion vector refinement (DMVR) (1000). Video encoder 200 may be configured to encode a first syntax element indicating that the first block of video data is to be decoded using adaptive affine DMVR.

Video encoder 200 may determine to set a first motion vector difference (MVD) for a first reference picture list to zero (1010). In one example, the first MVD is MVD0, the first reference picture list is reference picture list 0, the second MVD is MVD1, and the second reference picture list is reference picture list 1. In another example, the first MVD is MVD1, the first reference picture list is reference picture list 1, the second MVD is MVD0, and the second reference picture list is reference picture list 0.

In one example, video encoder 200 may encode a second syntax element that indicates to set the first MVD for the first reference picture list to zero. The second syntax element indicates if the first reference picture list is reference picture list 0 or reference picture list 1. In another example, to determine to set the first MVD for the first reference picture list to zero, video encoder 200 may determine to set the first MVD for the first reference picture list to zero based on a template matching cost or a bilateral matching cost.

Video encoder 200 may be further configured to refine control point motion vectors (CPMVs) associated with a second reference picture list to generate refined CPMVs (1020). To refine the CPMVs associated with the second reference picture list to generate the refined CPMVs, encoder 200 may determine, for each subblock in the first block of video data, a bilateral matching (BM) cost within a search range of a motion vector, accumulate the BM cost for a plurality of subblocks of the first block of video data to generate an accumulated BM cost, determine a second MVD for the CPMVs of the second reference picture list based on the accumulated BM cost, and determine the refined CPMVs based on the second MVD. In some examples, video encoder 200 may determine one or more of a search pattern, a search range, or cost metrics used for refining the CPMVs.

Video encoder 200 may then encode the first block of video data using the refined CPMVs (1030). Video encoder 200 may construct an adaptive affine merge candidate list for the first block of video data, wherein the adaptive affine merge candidate list is different than an affine merge candidate list for regular affine DMVR mode. In one example, the adaptive affine merge candidate list only includes affine merge candidates.

FIG. 11 is a flowchart illustrating another example method for decoding a current block in accordance with the techniques of this disclosure. The techniques of FIG. 11 may be performed by one or more structural components of video decoder 300, including motion compensation unit 316.

In one example, video decoder 300 may receive a first block of video data to be decoded using adaptive affine decoder side motion vector refinement (DMVR) (1100). Video decoder 300 may be configured to decode a first syntax element indicating that the first block of video data is to be decoded using adaptive affine DMVR.

Video decoder 300 may determine to set a first motion vector difference (MVD) for a first reference picture list to zero (1110). In one example, the first MVD is MVD0, the first reference picture list is reference picture list 0, the second MVD is MVD1, and the second reference picture list is reference picture list 1. In another example, the first MVD is MVD1, the first reference picture list is reference picture list 1, the second MVD is MVD0, and the second reference picture list is reference picture list 0.

In one example, to determine to set the first MVD for the first reference picture list to zero, video decoder 300 may decode a second syntax element that indicates to set the first MVD for the first reference picture list to zero. The second syntax element indicates if the first reference picture list is reference picture list 0 or reference picture list 1. In another example, to determine to set the first MVD for the first reference picture list to zero, video decoder 300 may determine to set the first MVD for the first reference picture list to zero based on a template matching cost or a bilateral matching cost.

Video decoder 300 may be further configured to refine control point motion vectors (CPMVs) associated with a second reference picture list to generate refined CPMVs (1120). To refine the CPMVs associated with the second reference picture list to generate the refined CPMVs, video decoder 300 may determine, for each subblock in the first block of video data, a bilateral matching (BM) cost within a search range of a motion vector, accumulate the BM cost for a plurality of subblocks of the first block of video data to generate an accumulated BM cost, determine a second MVD for the CPMVs of the second reference picture list based on the accumulated BM cost, and determine the refined CPMVs based on the second MVD. In some examples, video decoder 300 may determine one or more of a search pattern, a search range, or cost metrics used for refining the CPMVs.

Video decoder 300 may then decode the first block of video data using the refined CPMVs (1130). Video decoder 300 may construct an adaptive affine merge candidate list for the first block of video data, wherein the adaptive affine merge candidate list is different than an affine merge candidate list for regular affine DMVR mode. In one example, the adaptive affine merge candidate list only includes affine merge candidates.

The following numbered clauses illustrate one or more aspects of the devices and techniques described in this disclosure.

Aspect 1A—A method of coding video data, the method comprising: receiving a first block of video data to be coded using adaptive affine decoder side motion vector refinement (DMVR); determining to set a first motion vector difference (MVD) for a first reference picture list to zero; refining control point motion vectors (CPMVs) associated with a second reference picture list to generate a refined CPMVs; and coding the first block of video data using the refined CPMVs.

Aspect 2A—The method of Aspect 1A, wherein the first MVD is MVD0, the first reference picture list is reference picture list 0, the second MVD is MVD1, and the second reference picture list is reference picture list 1.

Aspect 3A—The method of Aspect 1A, wherein the first MVD is MVD1, the first reference picture list is reference picture list 1, the second MVD is MVD0, and the second reference picture list is reference picture list 0.

Aspect 4A—The method of any of Aspects 1A-3A, wherein refining the CPMVs associated with the second reference picture list using the second MVD to generate the refined CPMVs comprises: determining, for each subblock in the first block of video data, a bilateral matching (BM) cost within a search range of the motion vector; accumulating the BM cost; determining second MVDs for the CPMVs of the second reference picture list based on the accumulated BM cost; and determining the refined CMPVs from the second MVDs.

Aspect 5A—The method of any of Aspects 1A-4A, wherein determining to set the first MVD for the first reference picture list to zero comprises: coding a syntax element that indicates to set the first MVD for the first reference picture list to zero.

Aspect 6A—The method of any of Aspects 1A-4A, wherein determining to set the first MVD for the first reference picture list to zero comprises: determining to set the first MVD for the first reference picture list to zero based on a template matching cost or a bilateral matching cost.

Aspect 7A—The method of any of Aspects 1A-6A, further comprising: constructing an affine merge candidate list based on conditions for affine DMVR.

Aspect 8A—The method of any of Aspects 1A-7A, further comprising: determining one or more of a search pattern, a search range, or cost metrics for the adaptive affine DMVR.

Aspect 9A—The method of any of Aspects 1A-8A wherein coding comprises decoding.

Aspect 10A—The method of any of Aspects 1A-8A, wherein coding comprises encoding.

Aspect 11A—A device for coding video data, the device comprising one or more means for performing the method of any of Aspects 1A-10A.

Aspect 12A—The device of Aspect 11A, wherein the one or more means comprise one or more processors implemented in circuitry.

Aspect 13A—The device of any of Aspects 11A and 12A, further comprising a memory to store the video data.

Aspect 14A—The device of any of Aspects 11A-13A, further comprising a display configured to display decoded video data.

Aspect 15A—The device of any of Aspects 11A-14A, wherein the device comprises one or more of a camera, a computer, a mobile device, a broadcast receiver device, or a set-top box.

Aspect 16A—The device of any of Aspects 11A-15A, wherein the device comprises a video decoder.

Aspect 17A—The device of any of Aspects 11A-16A, wherein the device comprises a video encoder.

Aspect 18A—A computer-readable storage medium having stored thereon instructions that, when executed, cause one or more processors to perform the method of any of Aspects 1A-10A.

Aspect 1B—A method of decoding video data, the method comprising: receiving a first block of video data to be decoded using adaptive affine decoder side motion vector refinement (DMVR); determining to set a first motion vector difference (MVD) for a first reference picture list to zero; refining control point motion vectors (CPMVs) associated with a second reference picture list to generate refined CPMVs; and decoding the first block of video data using the refined CPMVs.

Aspect 2B—The method of Aspect 1B, wherein refining the CPMVs associated with the second reference picture list to generate the refined CPMVs comprises: determining, for each subblock in the first block of video data, a bilateral matching (BM) cost within a search range of a motion vector; accumulating the BM cost for a plurality of subblocks of the first block of video data to generate an accumulated BM cost; determining a second MVD for the CPMVs of the second reference picture list based on the accumulated BM cost; and determining the refined CPMVs based on the second MVD.

Aspect 3B—The method of Aspect 2B, wherein the first MVD is MVD0, the first reference picture list is reference picture list 0, the second MVD is MVD1, and the second reference picture list is reference picture list 1.

Aspect 4B—The method of Aspect 2B, wherein the first MVD is MVD1, the first reference picture list is reference picture list 1, the second MVD is MVD0, and the second reference picture list is reference picture list 0.

Aspect 5B—The method of any of Aspects 1B-4B, further comprising: decoding a first syntax element indicating that the first block of video data is to be decoded using adaptive affine DMVR.

Aspect 6B—The method of Aspect 5B, wherein determining to set the first MVD for the first reference picture list to zero comprises: decoding a second syntax element that indicates to set the first MVD for the first reference picture list to zero.

Aspect 7B—The method of Aspect 6B, wherein the second syntax element indicates if the first reference picture list is reference picture list 0 or reference picture list 1.

Aspect 8B—The method of any of Aspects 1B-7B, further comprising: constructing an adaptive affine merge candidate list for the first block of video data, wherein the adaptive affine merge candidate list is different than an affine merge candidate list for regular affine DMVR mode.

Aspect 9B—The method of Aspect 8B, wherein the adaptive affine merge candidate list only includes affine merge candidates.

Aspect 10B—The method of any of Aspects 1B-9B, further comprising: determining one or more of a search pattern, a search range, or cost metrics used for refining the CPMVs.

Aspect 11B—The method of Aspect 1B, wherein determining to set the first MVD for the first reference picture list to zero comprises: determining to set the first MVD for the first reference picture list to zero based on a template matching cost or a bilateral matching cost.

Aspect 12B—The method of any of Aspects 1B-11B, further comprising: displaying a picture that includes the first block of video data.

Aspect 13B—An apparatus configured to decode video data, the apparatus comprising: a memory; and one or more processors in communication with the memory, the one or more processors configured to: receive a first block of video data to be decoded using adaptive affine decoder side motion vector refinement (DMVR); determine to set a first motion vector difference (MVD) for a first reference picture list to zero; refine control point motion vectors (CPMVs) associated with a second reference picture list to generate refined CPMVs; and decode the first block of video data using the refined CPMVs.

Aspect 14B—The apparatus of Aspect 13B, wherein to refine the CPMVs associated with the second reference picture list to generate the refined CPMVs, the one or more processors are further configured to: determine, for each subblock in the first block of video data, a bilateral matching (BM) cost within a search range of a motion vector; accumulate the BM cost for a plurality of subblocks of the first block of video data to generate an accumulated BM cost; determine a second MVD for the CPMVs of the second reference picture list based on the accumulated BM cost; and determine the refined CPMVs based on the second MVD.

Aspect 15B—The apparatus of Aspect 14B, wherein the first MVD is MVD0, the first reference picture list is reference picture list 0, the second MVD is MVD1, and the second reference picture list is reference picture list 1.

Aspect 16B—The apparatus of Aspect 14B, wherein the first MVD is MVD1, the first reference picture list is reference picture list 1, the second MVD is MVD0, and the second reference picture list is reference picture list 0.

Aspect 17B—The apparatus of any of Aspects 13B-16B, wherein the one or more processors are further configured to: decode a first syntax element indicating that the first block of video data is to be decoded using adaptive affine DMVR.

Aspect 18B—The apparatus of Aspect 17B, wherein to determine to set the first MVD for the first reference picture list to zero, the one or more processors are further configured to: decode a second syntax element that indicates to set the first MVD for the first reference picture list to zero.

Aspect 19B—The apparatus of Aspect 18B, wherein the second syntax element indicates if the first reference picture list is reference picture list 0 or reference picture list 1.

Aspect 20B—The apparatus of any of Aspects 13B-19B, wherein the one or more processors are further configured to: construct an adaptive affine merge candidate list for the first block of video data, wherein the adaptive affine merge candidate list is different than an affine merge candidate list for regular affine DMVR mode.

Aspect 21B—The apparatus of Aspect 20B, wherein the adaptive affine merge candidate list only includes affine merge candidates.

Aspect 22B—The apparatus of any of Aspects 13B-21B, wherein the one or more processors are further configured to: determine one or more of a search pattern, a search range, or cost metrics used for refining the CPMVs.

Aspect 23B—The apparatus of Aspect 13B, wherein to determine to set the first MVD for the first reference picture list to zero, the one or more processors are further configured to: determine to set the first MVD for the first reference picture list to zero based on a template matching cost or a bilateral matching cost.

Aspect 24B—The apparatus of any of Aspects 13B-23B, further comprising: a display configured to display a picture that includes the first block of video data.

Aspect 25B—A method of encoding video data, the method comprising: receiving a first block of video data to be encoded using adaptive affine decoder side motion vector refinement (DMVR); determining to set a first motion vector difference (MVD) for a first reference picture list to zero; refining control point motion vectors (CPMVs) associated with a second reference picture list to generate refined CPMVs; and encoding the first block of video data using the refined CPMVs.

Aspect 26B—The method of Aspect 25B, wherein refining the CPMVs associated with the second reference picture list to generate the refined CPMVs comprises: determining, for each subblock in the first block of video data, a bilateral matching (BM) cost within a search range of a motion vector; accumulating the BM cost for a plurality of subblocks of the first block of video data to generate an accumulated BM cost; determining a second MVD for the CPMVs of the second reference picture list based on the accumulated BM cost; and determining the refined CPMVs based on the second MVD.

Aspect 27B—The method of Aspect 26B, wherein the first MVD is MVD0, the first reference picture list is reference picture list 0, the second MVD is MVD1, and the second reference picture list is reference picture list 1.

Aspect 28B—The method of Aspect 26B, wherein the first MVD is MVD1, the first reference picture list is reference picture list 1, the second MVD is MVD0, and the second reference picture list is reference picture list 0.

Aspect 29B—The method of any of Aspects 25B-28B, further comprising: encoding a first syntax element indicating that the first block of video data is to be decoded using adaptive affine DMVR.

Aspect 30B—The method of Aspect 29B, further comprising: encoding a second syntax element that indicates to set the first MVD for the first reference picture list to zero.

Aspect 31B—The method of Aspect 30B, wherein the second syntax element indicates if the first reference picture list is reference picture list 0 or reference picture list 1.

Aspect 32B—The method of any of Aspects 25B-31B, further comprising: constructing an adaptive affine merge candidate list for the first block of video data, wherein the adaptive affine merge candidate list is different than an affine merge candidate list for regular affine DMVR mode.

Aspect 33B—The method of Aspect 32B, wherein the adaptive affine merge candidate list only includes affine merge candidates.

Aspect 34B—The method of any of Aspects 25B-33B, further comprising: determining one or more of a search pattern, a search range, or cost metrics used for refining the CPMVs.

Aspect 35B—The method of Aspect 25B, wherein determining to set the first MVD for the first reference picture list to zero comprises: determining to set the first MVD for the first reference picture list to zero based on a template matching cost or a bilateral matching cost.

Aspect 36B—The method of any of Aspects 25B-35B, further comprising: capturing a picture that includes the first block of video data.

Aspect 37B—An apparatus configured to encode video data, the apparatus comprising: a memory; and one or more processors in communication with the memory, the one or more processors configured to: receive a first block of video data to be encoded using adaptive affine decoder side motion vector refinement (DMVR); determine to set a first motion vector difference (MVD) for a first reference picture list to zero; refine control point motion vectors (CPMVs) associated with a second reference picture list to generate refined CPMVs; and encode the first block of video data using the refined CPMVs.

Aspect 38B—The apparatus of Aspect 37B, wherein to refine the CPMVs associated with the second reference picture list to generate the refined CPMVs, the one or more processors are further configured to: determine, for each subblock in the first block of video data, a bilateral matching (BM) cost within a search range of a motion vector; accumulate the BM cost for a plurality of subblocks of the first block of video data to generate an accumulated BM cost; determine a second MVD for the CPMVs of the second reference picture list based on the accumulated BM cost; and determine the refined CPMVs based on the second MVD.

Aspect 39B—The apparatus of Aspect 38B, wherein the first MVD is MVD0, the first reference picture list is reference picture list 0, the second MVD is MVD1, and the second reference picture list is reference picture list 1.

Aspect 40B—The apparatus of Aspect 38B, wherein the first MVD is MVD1, the first reference picture list is reference picture list 1, the second MVD is MVD0, and the second reference picture list is reference picture list 0.

Aspect 41B—The apparatus of any of Aspects 37B-40B, wherein the one or more processors are further configured to: encode a first syntax element indicating that the first block of video data is to be decoded using adaptive affine DMVR.

Aspect 42B—The apparatus of Aspect 41B, wherein the one or more processors are further configured to: encode a second syntax element that indicates to set the first MVD for the first reference picture list to zero.

Aspect 43B—The apparatus of Aspect 42B, wherein the second syntax element indicates if the first reference picture list is reference picture list 0 or reference picture list 1.

Aspect 44B—The apparatus of any of Aspects 37B-43B, wherein the one or more processors are further configured to: construct an adaptive affine merge candidate list for the first block of video data, wherein the adaptive affine merge candidate list is different than an affine merge candidate list for regular affine DMVR mode.

Aspect 45B—The apparatus of Aspect 44B, wherein the adaptive affine merge candidate list only includes affine merge candidates.

Aspect 46B—The apparatus of any of Aspects 37B-45B, wherein the one or more processors are further configured to: determine one or more of a search pattern, a search range, or cost metrics used for refining the CPMVs.

Aspect 47B—The apparatus of Aspect 37B, wherein to determine to set the first MVD for the first reference picture list to zero, the one or more processors are further configured to: determine to set the first MVD for the first reference picture list to zero based on a template matching cost or a bilateral matching cost.

Aspect 48B—The apparatus of any of Aspects 37B-47B, further comprising: a camera configured to capture a picture that includes the first block of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

receiving a first block of video data to be decoded using adaptive affine decoder side motion vector refinement (DMVR);

in response to the first block using adaptive affine DMVR, determining to set a first motion vector difference (MVD) for a first reference picture list to zero;

in response to the first block using adaptive affine DMVR, refining control point motion vectors (CPMVs) associated with a second reference picture list to generate refined CPMVs; and decoding the first block of video data using the refined CPMVs.

2. The method of claim 1, wherein refining the CPMVs associated with the second reference picture list to generate the refined CPMVs comprises:

determining, for each subblock in the first block of video data, a bilateral matching (BM) cost within a search range of a motion vector;

accumulating the BM cost for a plurality of subblocks of the first block of video data to generate an accumulated BM cost;

determining a second MVD for the CPMVs of the second reference picture list based on the accumulated BM cost; and determining the refined CPMVs based on the second MVD.

3. The method of claim 2, wherein the first MVD is MVD0, the first reference picture list is reference picture list 0, the second MVD is MVD1, and the second reference picture list is reference picture list 1.

4. The method of claim 2, wherein the first MVD is MVD1, the first reference picture list is reference picture list 1, the second MVD is MVD0, and the second reference picture list is reference picture list 0.

5. The method of claim 1, further comprising:

decoding a first syntax element indicating that the first block of video data is to be decoded using adaptive affine DMVR.

6. The method of claim 5, wherein determining to set the first MVD for the first reference picture list to zero comprises:

decoding a second syntax element that indicates to set the first MVD for the first reference picture list to zero.

7. The method of claim 6, wherein the second syntax element indicates if the first reference picture list is reference picture list 0 or reference picture list 1.

8. The method of claim 1, further comprising:

constructing an adaptive affine merge candidate list for the first block of video data, wherein the adaptive affine merge candidate list is different than an affine merge candidate list for regular affine DMVR mode.

9. The method of claim 8, wherein the adaptive affine merge candidate list only includes affine merge candidates.

10. The method of claim 1, further comprising:

determining one or more of a search pattern, a search range, or cost metrics used for refining the CPMVs.

11. The method of claim 1, wherein determining to set the first MVD for the first reference picture list to zero comprises:

determining to set the first MVD for the first reference picture list to zero based on a template matching cost or a bilateral matching cost.

12. The method of claim 1, further comprising:

displaying a picture that includes the first block of video data.

13. An apparatus configured to decode video data, the apparatus comprising: a memory; and one or more processors in communication with the memory, the one or more processors configured to:

receive a first block of video data to be decoded using adaptive affine decoder side motion vector refinement (DMVR);

in response to the first block using adaptive affine DMVR, determine to set a first motion vector difference (MVD) for a first reference picture list to zero;

in response to the first block using adaptive affine DMVR, refine control point motion vectors (CPMVs) associated with a second reference picture list to generate refined CPMVs; and decode the first block of video data using the refined CPMVs.

14. The apparatus of claim 13, wherein to refine the CPMVs associated with the second reference picture list to generate the refined CPMVs, the one or more processors are further configured to:

determine, for each subblock in the first block of video data, a bilateral matching (BM) cost within a search range of a motion vector;

accumulate the BM cost for a plurality of subblocks of the first block of video data to generate an accumulated BM cost;

determine a second MVD for the CPMVs of the second reference picture list based on the accumulated BM cost; and determine the refined CPMVs based on the second MVD.

15. The apparatus of claim 14, wherein the first MVD is MVD0, the first reference picture list is reference picture list 0, the second MVD is MVD1, and the second reference picture list is reference picture list 1.

16. The apparatus of claim 14, wherein the first MVD is MVD1, the first reference picture list is reference picture list 1, the second MVD is MVD0, and the second reference picture list is reference picture list 0.

17. The apparatus of claim 13, wherein the one or more processors are further configured to:

decode a first syntax element indicating that the first block of video data is to be decoded using adaptive affine DMVR.

18. The apparatus of claim 17, wherein to determine to set the first MVD for the first reference picture list to zero, the one or more processors are further configured to:

decode a second syntax element that indicates to set the first MVD for the first reference picture list to zero.

19. The apparatus of claim 18, wherein the second syntax element indicates if the first reference picture list is reference picture list 0 or reference picture list 1.

20. The apparatus of claim 13, wherein the one or more processors are further configured to:

construct an adaptive affine merge candidate list for the first block of video data, wherein the adaptive affine merge candidate list is different than an affine merge candidate list for regular affine DMVR mode.

21. The apparatus of claim 20, wherein the adaptive affine merge candidate list only includes affine merge candidates.

22. The apparatus of claim 13, wherein the one or more processors are further configured to:

determine one or more of a search pattern, a search range, or cost metrics used for refining the CPMVs.

23. The apparatus of claim 13, wherein to determine to set the first MVD for the first reference picture list to zero, the one or more processors are further configured to:

determine to set the first MVD for the first reference picture list to zero based on a template matching cost or a bilateral matching cost.

24. The apparatus of claim 13, further comprising:

a display configured to display a picture that includes the first block of video data.

25. A method of encoding video data, the method comprising:

receiving a first block of video data to be encoded using adaptive affine decoder side motion vector refinement (DMVR);

in response to the first block using adaptive affine DMVR, determining to set a first motion vector difference (MVD) for a first reference picture list to zero;

in response to the first block using adaptive affine DMVR, refining control point motion vectors (CPMVs) associated with a second reference picture list to generate refined CPMVs; and encoding the first block of video data using the refined CPMVs.

26. The method of claim 25, wherein refining the CPMVs associated with the second reference picture list to generate the refined CPMVs comprises:

determining, for each subblock in the first block of video data, a bilateral matching (BM) cost within a search range of a motion vector;

accumulating the BM cost for a plurality of subblocks of the first block of video data to generate an accumulated BM cost;

determining a second MVD for the CPMVs of the second reference picture list based on the accumulated BM cost; and determining the refined CPMVs based on the second MVD.

27. The method of claim 26, wherein the first MVD is MVD0, the first reference picture list is reference picture list 0, the second MVD is MVD1, and the second reference picture list is reference picture list 1.

28. The method of claim 26, wherein the first MVD is MVD1, the first reference picture list is reference picture list 1, the second MVD is MVD0, and the second reference picture list is reference picture list 0.

29. The method of claim 25, further comprising:

encoding a first syntax element indicating that the first block of video data is to be decoded using adaptive affine DMVR.

30. The method of claim 29, further comprising:

encoding a second syntax element that indicates to set the first MVD for the first reference picture list to zero.

31. The method of claim 30, wherein the second syntax element indicates if the first reference picture list is reference picture list 0 or reference picture list 1.

32. The method of claim 25, further comprising:

constructing an adaptive affine merge candidate list for the first block of video data, wherein the adaptive affine merge candidate list is different than an affine merge candidate list for regular affine DMVR mode.

33. The method of claim 32, wherein the adaptive affine merge candidate list only includes affine merge candidates.

34. The method of claim 25, further comprising:

determining one or more of a search pattern, a search range, or cost metrics used for refining the CPMVs.

35. The method of claim 25, wherein determining to set the first MVD for the first reference picture list to zero comprises:

determining to set the first MVD for the first reference picture list to zero based on a template matching cost or a bilateral matching cost.

36. The method of claim 25, further comprising:

capturing a picture that includes the first block of video data.

37. An apparatus configured to encode video data, the apparatus comprising: a memory; and one or more processors in communication with the memory, the one or more processors configured to:

receive a first block of video data to be encoded using adaptive affine decoder side motion vector refinement (DMVR);

in response to the first block using adaptive affine DMVR, determine to set a first motion vector difference (MVD) for a first reference picture list to zero;

in response to the first block using adaptive affine DMVR, refine control point motion vectors (CPMVs) associated with a second reference picture list to generate refined CPMVs; and encode the first block of video data using the refined CPMVs.

38. The apparatus of claim 37, wherein to refine the CPMVs associated with the second reference picture list to generate the refined CPMVs, the one or more processors are further configured to:

determine, for each subblock in the first block of video data, a bilateral matching (BM) cost within a search range of a motion vector;

accumulate the BM cost for a plurality of subblocks of the first block of video data to generate an accumulated BM cost;

determine a second MVD for the CPMVs of the second reference picture list based on the accumulated BM cost; and determine the refined CPMVs based on the second MVD.

39. The apparatus of claim 38, wherein the first MVD is MVD0, the first reference picture list is reference picture list 0, the second MVD is MVD1, and the second reference picture list is reference picture list 1.

40. The apparatus of claim 38, wherein the first MVD is MVD1, the first reference picture list is reference picture list 1, the second MVD is MVD0, and the second reference picture list is reference picture list 0.

41. The apparatus of claim 37, wherein the one or more processors are further configured to:

encode a first syntax element indicating that the first block of video data is to be decoded using adaptive affine DMVR.

42. The apparatus of claim 41, wherein the one or more processors are further configured to:

encode a second syntax element that indicates to set the first MVD for the first reference picture list to zero.

43. The apparatus of claim 42, wherein the second syntax element indicates if the first reference picture list is reference picture list 0 or reference picture list 1.

44. The apparatus of claim 37, wherein the one or more processors are further configured to:

construct an adaptive affine merge candidate list for the first block of video data, wherein the adaptive affine merge candidate list is different than an affine merge candidate list for regular affine DMVR mode.

45. The apparatus of claim 44, wherein the adaptive affine merge candidate list only includes affine merge candidates.

46. The apparatus of claim 37, wherein the one or more processors are further configured to:

determine one or more of a search pattern, a search range, or cost metrics used for refining the CPMVs.

47. The apparatus of claim 37, wherein to determine to set the first MVD for the first reference picture list to zero, the one or more processors are further configured to:

determine to set the first MVD for the first reference picture list to zero based on a template matching cost or a bilateral matching cost.

48. The apparatus of claim 37, further comprising:
a camera configured to capture a picture that includes the
first block of video data.

\* \* \* \* \*